United States Patent
Hahn et al.

(10) Patent No.: US 10,613,778 B2
(45) Date of Patent: Apr. 7, 2020

(54) DYNAMIC HOST MEMORY ALLOCATION TO A MEMORY CONTROLLER

(71) Applicant: Western Digital Technologies, Inc., San Jose, CA (US)

(72) Inventors: Judah Gamliel Hahn, Ofra (IL); Alon Marcu, Tel-Mond (IL); Ariel Navon, Revava (IL); Alexander Bazarsky, Holon (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 8 days.

(21) Appl. No.: 15/927,644

(22) Filed: Mar. 21, 2018

(65) Prior Publication Data

US 2019/0294350 A1 Sep. 26, 2019

(51) Int. Cl.
*G06F 3/06* (2006.01)

(52) U.S. Cl.
CPC .......... *G06F 3/0631* (2013.01); *G06F 3/0604* (2013.01); *G06F 3/0656* (2013.01); *G06F 3/0679* (2013.01)

(58) Field of Classification Search
CPC .... G06F 3/0604; G06F 3/0631; G06F 3/0656; G06F 3/0679
See application file for complete search history.

(56) References Cited

U.S. PATENT DOCUMENTS

| | | | |
|---|---|---|---|
| 6,745,283 B1 | 6/2004 | Dang | |
| 6,934,826 B2 | 8/2005 | Lubbers et al. | |
| 9,563,382 B2 | 2/2017 | Hahn et al. | |
| 2010/0250836 A1 | 9/2010 | Sokolov et al. | |
| 2015/0356020 A1 | 12/2015 | Desai et al. | |
| 2016/0026406 A1 | 1/2016 | Hahn et al. | |
| 2016/0246726 A1 | 8/2016 | Hahn | |
| 2017/0102879 A1 | 4/2017 | Benisty et al. | |
| 2017/0285940 A1 | 10/2017 | Benisty et al. | |
| 2017/0351452 A1* | 12/2017 | Boyd | G06F 3/0611 |
| 2018/0039578 A1 | 2/2018 | Yun et al. | |
| 2019/0042460 A1* | 2/2019 | Trika | G06F 12/1009 |

OTHER PUBLICATIONS

NVM Express, "NVM Express," Revision 1.3a, Oct. 24, 2017, 287 pages.
International Search Report & The Written Opinion dated Mar. 11, 2019, International Application No: PCT/US2018/061830 filed Nov. 19, 2018.

* cited by examiner

*Primary Examiner* — Aracelis Ruiz
(74) *Attorney, Agent, or Firm* — Vierra Magen Marcus LLP

(57) ABSTRACT

Technology is described herein for operating non-volatile storage. One aspect is an apparatus that dynamically changes an allocation of host memory that is for the exclusive use of a non-volatile memory controller. The non-volatile memory controller may make a runtime request for additional host memory that is for the exclusive use of the non-volatile memory controller. The non-volatile memory controller might use the additional host memory for a task such as garbage collection, and then release the host memory back to the host.

25 Claims, 12 Drawing Sheets

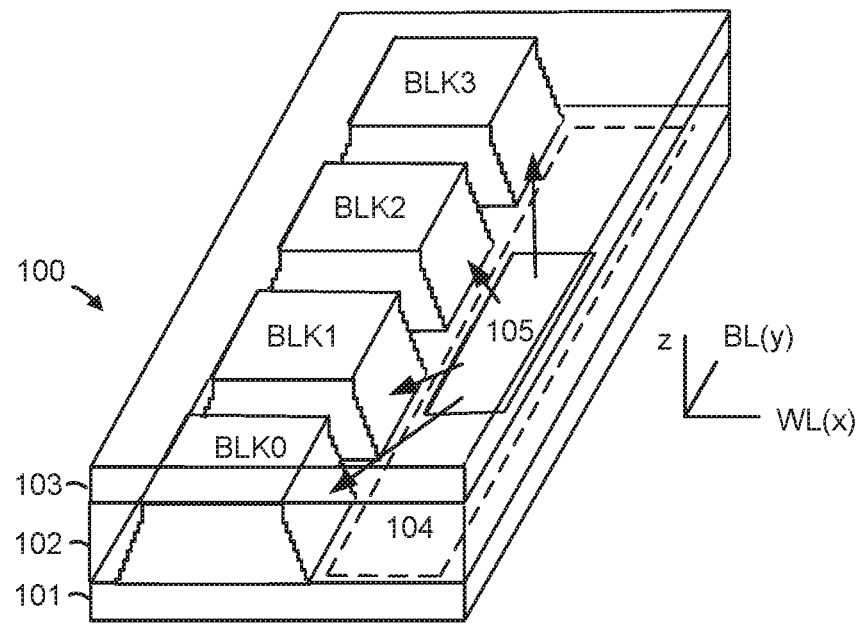

DYNAMIC HOST MEMORY ALLOCATION TO A MEMORY CONTROLLER

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other non-volatile memory systems. Typically, the non-volatile memory system has a memory controller which controls access of a host system to non-volatile memory in memory system. The host system could be computer system, cellular telephone, server, etc. The non-volatile memory system and host system may exchange data over, for example, a Peripheral Computer Interface Express (PCIe) bus. Non-volatile Memory Express (NVMe) is a logical device interface specification for accessing non-volatile storage attached via a PCIe bus. NVMe takes advantage of parallelism offered by semiconductor memory such as, but not limited to, solid state drives.

The memory controller will typically have some amount of volatile memory, which it may use for a variety of tasks. For example, the volatile memory can be used to cache a portion of a management table that is used to translate between logical addresses used by the host system and physical addresses in the non-volatile memory. Note that a full version of the management table may be stored in the non-volatile memory. A benefit of caching the management table is that when the memory system receives a read or write request, it can determine which memory location needs to be accessed based on a much quicker lookup in the memory controller's volatile memory. For fast consistent performance, the organization of the management table may be chosen to minimize the amount of computation and number of volatile memory lookups required at the expense of requiring more volatile memory. The memory controller may use the volatile memory for other purposes.

In some memory access protocols, the host system may make a portion of its host memory available for the exclusive use of the memory controller. For example, some versions of the NVMe protocol allow a Host Memory Buffer (HMB) option in which a portion of the host memory is allocated for the exclusive use of the memory controller. This option can save cost by allowing the memory controller to have less volatile memory.

BRIEF DESCRIPTION OF THE DRAWINGS

FIG. 1A is a perspective view of a set of blocks in a 3D stacked non-volatile memory device.

DETAILED DESCRIPTION

Figure 1B:
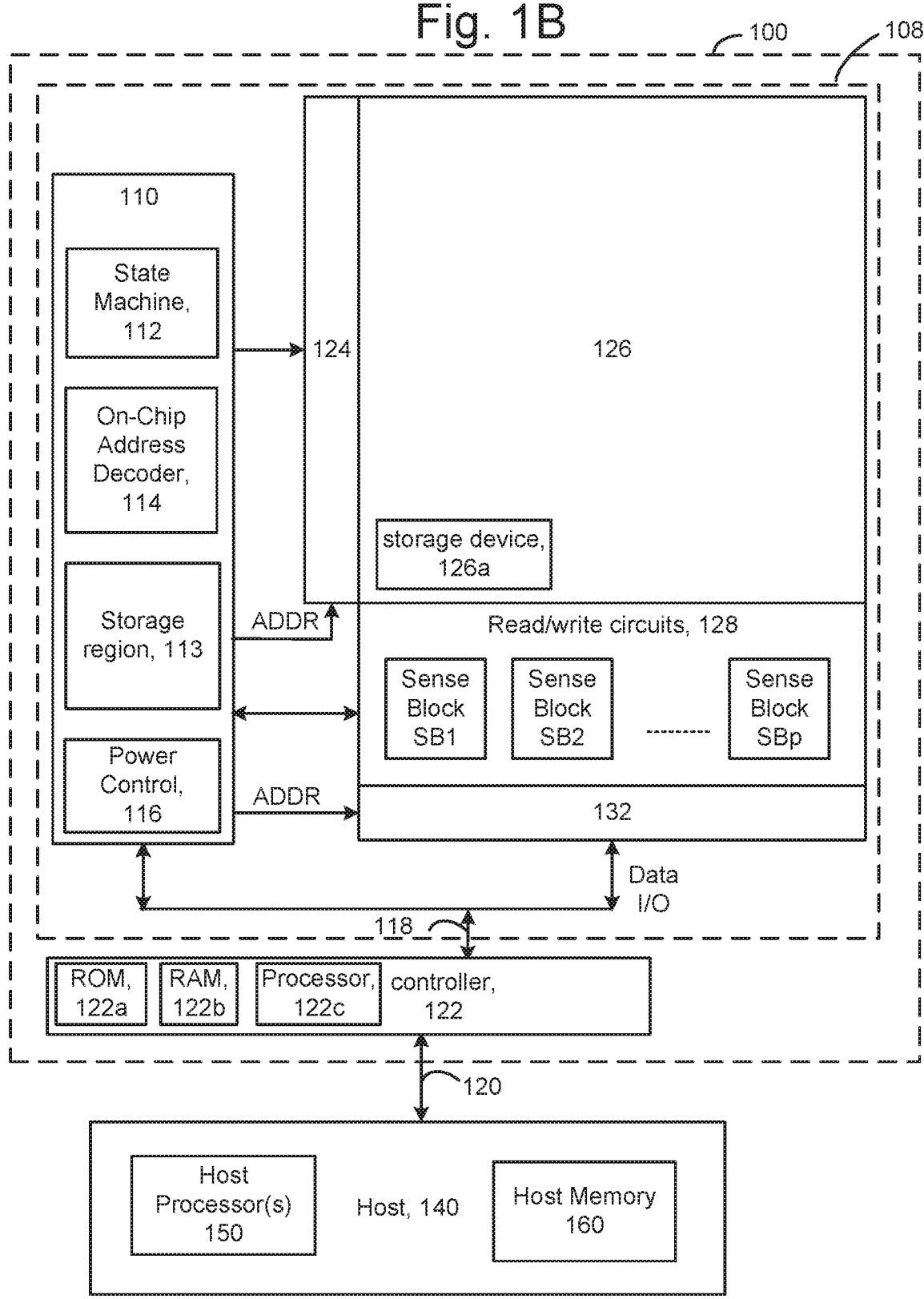
FIG. 1B is a functional block diagram of a memory device such as the 3D stacked non-volatile memory device of FIG. 1A.

Technology is described herein for operating non-volatile storage. One embodiment is an apparatus that dynamically changes an allocation of host memory that is for the exclusive use of a non-volatile memory controller. In one embodiment, the non-volatile memory controller may make a runtime request for additional host memory that is for the exclusive use of the non-volatile memory controller. The non-volatile memory controller might use the additional host memory for a task such as garbage collection, and then release the host memory back to the host.

Note that some memory access protocols may have a static host memory allocation model. A static host memory allocation model may allocate a fixed amount of host memory to a non-volatile memory controller at, for example, memory controller initialization. The amount of host memory that is committed to the non-volatile memory controller may remain at the maximum allocation throughout runtime. For example, the non-volatile memory controller may remain at the maximum allocation from the time the non-volatile memory controller is initialized until the non-volatile memory controller is shut down.

Thus, a static allocation model might not be efficient. For example, the non-volatile memory controller might be allocated a large fixed amount of host memory, when the non-volatile memory controller only needs that large amount for short periods of time. Embodiments of an apparatus that dynamically allocates host memory to the non-volatile memory controller during runtime make more efficient use of host memory.

Herein, "runtime" is defined as the period of time after the initialization of the memory controller is complete but before shutting down the memory controller begins. During runtime, the host system (e.g., host controller) may issue memory access requests (e.g., read, write) to the memory controller to access non-volatile memory. As will be discussed below, in one embodiment, during runtime the memory controller may request a specified amount of host memory for exclusive use of the memory controller. A change to the previous amount of host memory that was allocated for exclusive use of the memory controller is referred to herein as a "dynamic change". A dynamic change typically occurs during runtime.

Technology described herein may be used with a variety of types of non-volatile memory. One example is a three-dimensional (3D) non-volatile memory device. However, embodiments may also be practiced in two-dimensional (2D) non-volatile memory device. FIG. 1A is a perspective view of a set of blocks in a 3D stacked non-volatile memory device 100. The non-volatile memory device 100 may also be referred to herein as a non-volatile memory system 100. The non-volatile memory device 100 includes a substrate 101. On the substrate are example blocks BLK0, BLK1, BLK2 and BLK3 of memory cells (storage elements) and a peripheral area 104 with circuitry for use by the blocks. For example, the circuitry can include voltage drivers 105 which can be connected to control gate layers of the blocks. In one approach, control gate layers at a common height in the blocks are commonly driven. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory system, one or more upper metal layers are patterned in conductive paths to carry signals of the circuitry. Each block comprises a stacked area of memory cells, where alternating levels of the stack represent control gate layers. In one possible approach, the control gate layers of each block at a common height are connected to one another and to a voltage driver. While four blocks are depicted as an example, two or more blocks can be used, extending in the x- and/or y-directions.

The length of the plane, in the x-direction, may represent a direction in which signal paths to word lines extend in the one or more upper metal layers (e.g., a word line or drain side select gate (SGD) line direction), and the width of the plane, in the y-direction, represents a direction in which signal paths to bit lines extend in the one or more upper metal layers (e.g., a bit line direction). The z-direction represents a height of the memory device.

FIG. 1B is a functional block diagram of a non-volatile memory device such as the 3D stacked non-volatile memory device 100 of FIG. 1A. The functional block diagram may also be used for a 2D non-volatile memory device. Host system 140 has one or more host processors 150 and host memory 160. Host memory 160 may include, but is not limited to, Static Random Access Memory (SRAM) and Dynamic Random Access Memory (DRAM). Commands and data are transferred between the host system 140 and non-volatile memory controller 122 via an interface (e.g., data bus) 120 and between the memory controller and the one or more memory die 108 via lines 118. The interface 120 may also be referred to as a communication interface. Note that "non-volatile memory controller" 122 may be referred to herein more succinctly as "memory controller" or "controller".

The interface 120 between the host system 140 and the memory controller 122 may be any suitable interface. In one embodiment, the interface 120 includes a Peripheral Component Interconnect Express (PCIe) bus. In one embodiment, the memory system 100 and host system 140 communicate over the PCIe bus using NVMe. NVMe is a logical device interface that may be used to access non-volatile storage attached when using a PCIe bus between the host system 140 and the non-volatile memory device 100. However, note that the logical device interface is not limited to NVMe. Also, the interface 120 is not limited to a PCIe bus.

In one embodiment, the non-volatile memory system 100 may be a card based system, such as a secure digital (SD) or a micro secure digital (micro-SD) card. In an alternative embodiment, the non-volatile memory system 100 may be part of an embedded non-volatile memory device. For example, the non-volatile memory system 100 may be embedded within the host system 140, such as in the form of a solid state disk (SSD) drive installed in a personal computer.

The non-volatile memory device 100 may include one or more memory die 108. The set of blocks of FIG. 1A can be on one memory die 108. The memory die 108 includes a memory structure 126 of memory cells, such as an array of memory cells, control circuitry 110, and read/write circuits 128. In a 3D configuration, the memory structure can include the blocks of FIG. 1A. The memory structure 126 is addressable by word lines via a row decoder 124 and by bit lines via a column decoder 132. The read/write circuits 128 include multiple sense blocks SB1, SB2, . . . , SBp (sensing circuitry) and allow a page of memory cells to be read or programmed in parallel. Typically, a memory controller 122 is included in the same non-volatile memory device 100 (e.g., a removable storage card) as the one or more memory die 108.

Multiple memory elements in memory structure 126 may be configured so that they are connected in series or so that each element is individually accessible. By way of non-limiting example, flash memory systems in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

Other types of non-volatile memory in addition to NAND flash memory can also be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase change memory (e.g., PCRAM), and other semiconductor elements capable of storing information. Each type of memory device may have different configurations. For example, flash memory devices may be configured in a NAND or a NOR configuration.

The memory elements can be formed from passive and/or active elements, in any combination. By way of non-limiting example, passive semiconductor memory elements include ReRAM device elements, which in some embodiments include a resistivity switching storage element, such as an anti-fuse or phase change material, and optionally a steering element, such as a diode or transistor. The phase change material may include a chalcogenide material. Further by way of non-limiting example, active semiconductor memory elements include EEPROM and flash memory device elements, which in some embodiments include elements containing a charge storage region, such as a floating gate, conductive nanoparticles, or a charge storage dielectric material.

The memory structure 126 can be two-dimensional (2D) or three-dimensional (3D). The memory structure 126 may comprise one or more arrays of memory elements (also referred to as memory cells). In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a memory controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 132. The power control module 116 controls the power and voltages supplied to the word lines and bit lines during memory operations. It can include drivers for word line layers (WLLs) in a 3D configuration, SGS and SGD select gates and source lines. The sense blocks can include bit line drivers, in one approach. A source side select gate (SGS) is a gate transistor at a source-end of a NAND string, and a drain side select gate (SGD) is a transistor at a drain-end of a NAND string.

In some implementations, some of the components can be combined. In various designs, one or more of the components (alone or in combination), other than memory structure 126, can be thought of as one or more control circuits which are configured to perform the actions described herein. For example, one or more control circuits may include any one of, or a combination of, control circuitry 110, state machine 112, decoders 114/124/132, power control module 116, sense blocks SB1, SB2, . . . , SBp, read/write circuits 128, memory controller 122, processor 122c, and so forth.

The memory controller 122 may comprise a processor 122c and storage devices (memory) such as read only memory (ROM) 122a and RAM 122b. RAM 122b may be, but is not limited to, SRAM and DRAM. The storage devices comprise code such as a set of instructions, and the processor is operable to execute the set of instructions to provide the functionality described herein. Alternatively or additionally, the processor can access code from a storage device region 126a of the memory structure, such as a reserved area of memory cells in one or more word lines.

The code is used by the memory controller 122 to access the memory structure 126 such as for programming, read and erase operations. The code can include boot code and control code (e.g., a set of instructions). The boot code is software that initializes the memory controller during a booting or startup process and enables the memory controller to access the memory structure. The code can be used by the memory controller to control one or more memory structures. Upon being powered up, the processor 122c fetches the boot code from the ROM 122a or storage device region 126a for execution, and the boot code initializes the system components and loads the control code into the RAM 122b. Once the control code is loaded into the RAM 122b, it is executed by the processor 122c. The control code includes drivers to perform basic tasks such as controlling and allocating memory, prioritizing the processing of instructions, and controlling input and output ports.

Figure 2A:
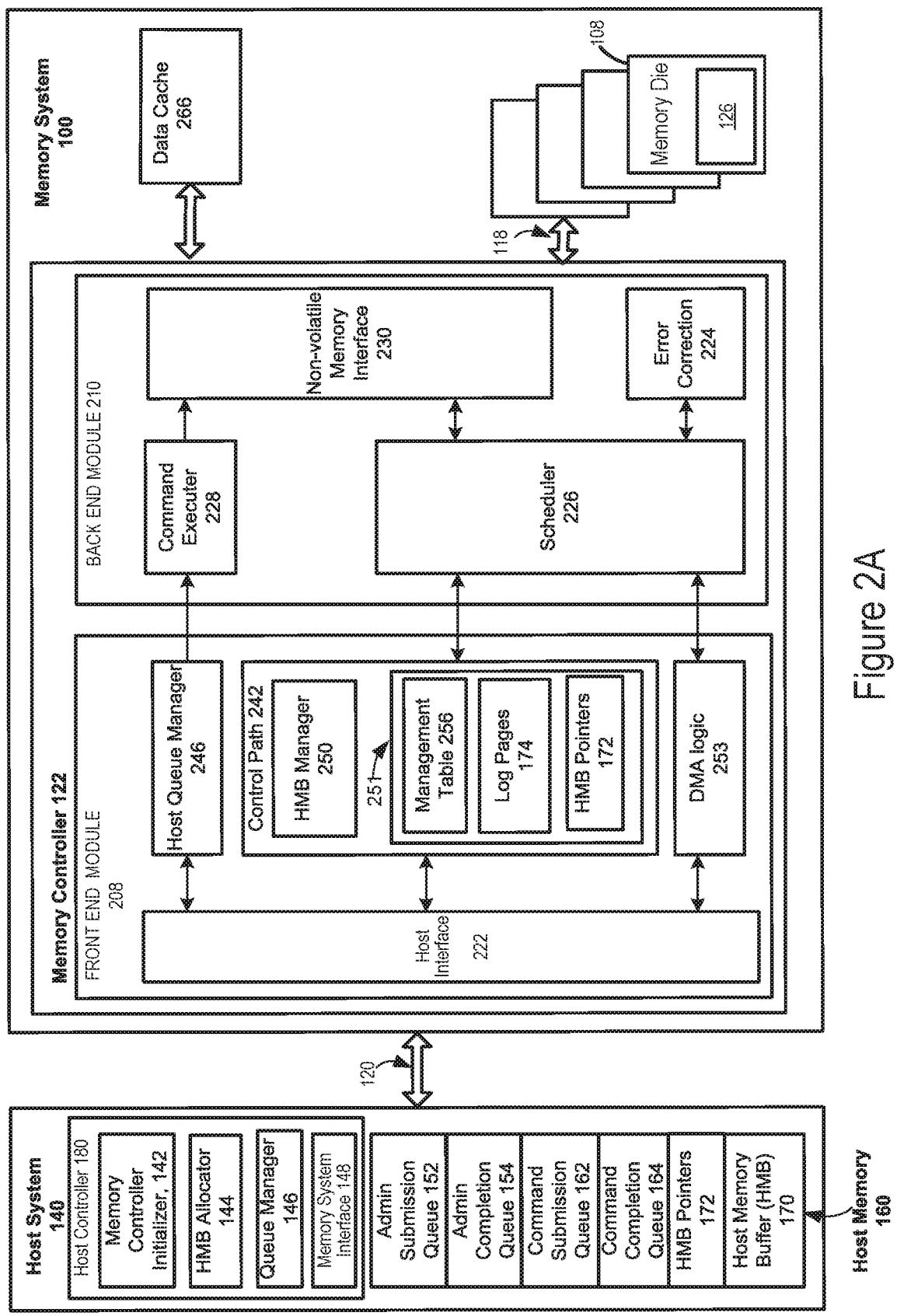
FIG. 2A is a block diagram of one embodiment of a non-volatile memory device and host, depicting more details of memory controller and host system.

FIG. 2A is a block diagram of example non-volatile memory system 100, depicting more details of one embodiment of a memory controller 122 and host system 140. In one embodiment, the system of FIG. 2A is a solid state drive. As used herein, a memory controller is a device that manages data stored on a non-volatile memory device and communicates with a host system, such as a computer or electronic device. In some embodiments, the memory die 108 contains flash (e.g., NAND, NOR) memory cells, in which case the memory controller 122 may be a flash memory controller.

A memory controller can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when a host needs to read data from or write data to the memory, it will communicate with the memory controller. If the host provides a logical address (LA) to which data is to be read/written, the memory controller can convert the logical address received from the host to a physical address in the memory. The logical address may be a logical block address (LBA), and the physical address may be a physical block address (PBA). (Alternatively, the host can provide the physical address). The memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The memory controller may be configured to implement a memory access protocol, such as an NVMe protocol. In some embodiments, the memory controller 122 is configured to implement an extension to an NVMe protocol that allows the memory controller to request a dynamic change to the size of the HMB 170. A memory controller 122 that implements an NVMe protocol or an extension to an NVMe protocol that allows the memory controller to request a dynamic change to the size of the HMB 170 is referred to herein as an NVMe memory controller. Likewise, a host controller 180 that implements an NVMe protocol or an extension to an NVMe protocol that grants the memory controller request of a dynamic change to the size of the HMB 170 is referred to herein as an NVMe host controller.

In one embodiment, the host system 140 may use host memory 160 to store admin submission queues 152, admin completion queues 154, command submission queues (SQs) 162 and command completion queues (CQs) 164. The admin submission queues 152 and admin completion queues 154 may be used to control and manage the memory controller 122. In one embodiment, the admin submission queues 152 and admin completion queues 154 are NVMe admin submission queues and admin completion queues, respectively.

Commands to access the memory structure 126 in the memory die 108 may be placed by the host into a command submission queue 162. For example, a command might be to read from or write to the memory structure 126. In one embodiment, a command submission queue 162 is a circular buffer with a fixed size slot. In one embodiment, the host informs the non-volatile memory device when a new command has been placed on a command submission queue 162. One such mechanism is referred to herein as a "doorbell." In one embodiment, command submission queues (SQs) 162 and command completion queues (CQs) 164 are NVMe command submission queues and command completion queues, respectively.

The memory controller 122 may write to an associated command completion queue 164 to post status for completed commands. In one embodiment, a command completion queue 164 is a circular buffer with a fixed size slot. The term "queue," as used herein (including, but not limited to admin submission queues 152, admin completion queues 154, SQ 162 and CQ 164) means non-transitory storage containing a data structure. The non-transitory storage could be, for example, host memory 160, RAM 122b, memory structure 126, etc.

A portion of the host memory 160 may be used for a host memory buffer (HMB) 170. The HMB 170 may be a buffer that is allocated by the host system 140 for use of the memory controller 122. In some embodiments, the HMB 170 is for exclusive usage of the memory controller 122. For example, the memory controller 122 could use the HMB 170 to cache data. The host system 140 guarantees that the data in the HMB 170 will be valid and is obliged to notify the memory controller 122 before any operation which might cause data loss (e.g., power loss, host might need this buffer, etc., . . . ), in one embodiment. The host system 140 lets the memory controller 122 acknowledge this operation before the data is lost, in one embodiment. In one embodiment, the host system 140 make an initial allocation of the HMB 170 to the memory controller 122 when the memory controller 122 is initialized. The memory controller 122 is initialized when the non-volatile memory device 100 is powered on, in one embodiment. The initial allocation may be compliant with NVMe; however, the initial allocation of HMB is not limited to NVMe.

The HMB 170 may be logically divided into units such a data buffers. For example, each buffer could be 4K, or some other size. The host memory 160 may be used to store HMB pointers 172. The HMB pointers 172 may contain physical addresses in host memory 160 of the buffers. The HMB pointers 172 might also contain a size parameter, which indicates the size of a buffer. In one embodiment, the HMB pointers 172 include a descriptor list. One embodiment of a descriptor list is shown and described with respect to FIG. 4.

Note that a portion of host memory 160 may be used for data buffers in which the host system 140 may store host data to be written to the memory structure 126, or to store host data that was read from the memory structure 126. However, this portion of host memory 160 has not been depicted in FIG. 2A.

The host system 140 has a host controller 180. A host controller 180, as the term is used herein, is a device that communicates with a non-volatile memory controller 122 in order to access non-volatile memory, which is under the control of the non-volatile memory controller 122. Host controller 180 may be configured to implement host controller functions of a memory access protocol, including but not limited to NVMe. Note that host controller 180 may be configured to implement techniques which may be extensions to a memory access protocol such as NVMe.

The host controller 180 has an HMB allocator 144, which may be configured to allocate the HMB to the memory controller 122. In one embodiment, the HMB allocator 144 is configured to make a static allocation of HMB 170 during initialization of the memory controller 122, and dynamic allocations of HMB 170 to the memory controller 122 during runtime. Further details are shown and described with respect to FIGS. 3, 4, 5, 6, and 8.

The host controller 180 has a queue manager 146, which may be configured to manage the admin submission queue 152, admin completion queue 154, command submission queue 162, and command completion queue.

The host controller 180 has a memory controller initializer 142, which may be configured to initialize the memory controller 122. The memory controller initializer 142 may work in combination with the queue manager 146 and/or HMB allocator 144 to perform one or more of the following during initialization. The admin submission queue 152 and the admin completion queue 154 may be configured. Various settings for the memory controller 122 may be configured. The host system 140 may allocate an appropriate number of command submission queues 162 and command completion queues based on the configuration of the host system 140 and number supported by the memory controller 122. The host controller 180 may send the memory controller 122 a command that indicates that the host system 140 desires asynchronous notification of an event. In one embodiment, the event is that the memory controller 122 is requesting a dynamic (or runtime) change in the size of the HMB 170.

The host controller 180 has a memory system interface 148, which may be configured to communicate with the memory controller over interface 120. The memory system interface 148 may include a physical layer interface (PHY) 148 that provides an electrical interface with the memory system 100 and/or interface 120. In one embodiment, PHY includes hardware that is compliant with Peripheral Component Interconnect Express (PCIe). However, PHY is not limited to PCIe. The memory system interface 148 typically facilitates transfer for data, control signals, and timing signals over interface 120.

The memory controller initializer 142, HMB allocator 144, queue manager 146, and memory system interface 148 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module (including, but not limited to, controller initializer 142, HMB allocator 144, and queue manager 146) may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include or comprise software stored in a processor readable device (e.g., host memory 160) to program one or more processors 150 to perform the functions described herein.

As depicted in FIG. 2A, the memory controller 122 includes a front end module 208 that interfaces with host system 140, a back end module 210 that interfaces with the one or more memory die 108, each containing various other components or modules that perform functions which will now be described in detail.

The memory controller 122 may interface with one or more memory dies 108. In one embodiment, the memory controller 122 and multiple memory dies (together comprising the non-volatile memory device 100) implement a solid state drive (SSD), which can emulate, replace or be used instead of a hard disk drive inside a host, as a Network Attached Storage (NAS) device, etc. Additionally, the SSD need not be made to work as a hard drive.

In some embodiments, the non-volatile memory device 100 includes a single channel between the memory controller 122 and memory die 108, the subject matter described herein is not limited to having a single memory channel. For example, in some non-volatile memory device architectures, 2, 4, 8 or more channels may exist between the memory controller 122 and the memory die, depending on memory controller capabilities. In any of the embodiments described herein, more than a single channel may exist between the memory controller and the memory die, even if a single channel is shown in the drawings.

Referring again to modules of the memory controller 122, front end module 208 includes a host interface 222 that provide the electrical interface with the host system 140 or a next level storage memory controller. The host interface 222 may include a physical layer interface (PHY) 222. In one embodiment, host interface 222 includes hardware that is compliant with Peripheral Component Interconnect Express (PCIe). However, host interface 222 is not limited to PCIe. The host interface 222 typically facilitates transfer for data, control signals, and timing signals. The host interface may be configured to configured to provide communication with host system 140.

A host queue manager 246 is configured to fetch and parse commands from the command submission queue 162. The host queue manager 246 may also queue the commands internally (i.e., within the memory controller 122) for execution. In one embodiment, the host queue manager 246 determines when to send a command from the internal queue (within the memory controller 122) to a command executer 228 within a backend module 210 of the memory controller 122. In one embodiment, the host queue manager 246 also sends an indication to the host system 140 when a command is complete. For example, the host queue manager 246 could store information on command completion queue 164 when a command (such as a read or write command) is complete.

The host queue manager 246 is also configured to fetch and parse commands from the admin submission queue 152. In one embodiment, one of the commands that is fetched is for the memory controller to provide the host system 140 with an asynchronous event notification. The asynchronous event notification may be used to request a dynamic change in the size of the HMB 170. In one embodiment, the asynchronous event notification command that is fetched from the admin submission queue 152 is compliant with an NVMe Asynchronous Event Request. In one embodiment, the host queue manager 246 post to the admin completion queue 154 in order to inform the host of the asynchronous event. For example, the host queue manager 246 may post a response to the admin completion queue 154 to trigger a request a dynamic change in the size of the HMB 170.

The control path 242 has HMB manager 250. The control path 242 has access to storage 251 that may be used to store therein log pages 174, management tables 256, and HMB pointers 172. Storage 251 may be volatile or non-volatile memory. The HMB manager 250 is configured to make requests for an allocation of HMB 170. The HMB manager 250 may be configured to request an initial allocation of HMB during memory controller initialization. The HMB manager 250 is configured to make a request for additional HMB 170 during runtime (e.g., after the memory controller is initialized), in one embodiment. The HMB manager 250 is configured to release the additional HMB 170 after the memory controller 122 is done using the additional HMB 170, in one embodiment.

The storage 251 to which control path 242 has access may be used to store HMB pointers 172. The HMB pointers 172 are data buffer pointers to the HMB 170. For example, each HMB pointer 172 could point to one unit of memory. Each unit of memory could be a page, wherein the page size is set by the host system 140. In one embodiment, the HMB pointers 172 are Host Memory Buffer Descriptors, in accordance with the NVMe protocol. However, the HMB pointers 172 are not limited to the NVMe protocol. The HMB pointers 172 may be provided by the HMB allocator 144 in the host system 140. The HMB pointers 172 in storage 251 may be a copy of the HMB pointers in host memory 160.

The storage 251 may be used to store log pages 174. The log pages 174 be used to store various information to report to the host system 140. In one embodiment, a log page 174 is used to store information to request a change in the amount of HMB 170. For example, a log page 174 may contain a request for additional HMB, to release a portion of the HMB 170 back to the host system 140. One embodiment of a log page is shown and described with respect to FIG. 7.

The storage 251 may be used to store management tables 256. In one embodiment, the management tables 256 include L2P tables (logical to physical mappings) and P2L tables (physical to logical mappings). The memory controller 122 can use the management tables 256 to map logical addresses (LAs) to physical addresses (PAs). Such tables 256 can be used to directly map LAs to the PAs, or LAs can be mapped to intermediate or virtual addresses, which are mapped to PAs. In some embodiments, the logical addresses are logical block addresses, and the physical addresses are physical block addresses. Other variations are also possible.

The management tables 256 may also be used to manage caching of data in locations other than the memory structure 126 in the memory die 108. In one embodiment, the memory controller 122 caches data in the HMB 170. For example, the memory controller 122 may use the HMB 170 to cache data that is associated with some LA (or range of LAs). The management tables 256 may also be used to manage caching of data in the HMB 170. In one embodiment, the memory controller 122 caches data in the data cache 266. For example, the memory controller 122 may use the data cache 266 to cache data that is associated with some LA (or range of LAs). The management tables 256 may also be used to manage caching of data in the data cache 266. The data cache 266 is volatile memory (such as RAM 122*b* of FIG. 1B), in one embodiment.

The front end module 208 can include other elements not expressly depicted in FIG. 2A. In one embodiment, front end module 208 includes various registers. In one embodiment, one of the registers is a "doorbell register," which the host system 140 may write in to inform the non-volatile memory device 100 that a new command is on the SQ 162.

DMA logic 253 is configured to control DMA transfer of data between the non-volatile memory device 100 and the host memory 160 in the host system 140. DMA logic 253 is also able to make a direct memory access to the host memory buffer 170. For example, DMA logic 253 may cache data into the HMB 170. For example, DMA logic 253 may access data from HMB 170 and transfer it to RAM (e.g., FIG. 1B, 122*b*). DMA logic 253 may use HMB pointers 172 to access the correct location in HMB 170.

Back end module 210 includes a Scheduler 226, command executer 228, an error correction Controller (ECC) engine 224, and a non-volatile memory interface 230.

Command scheduler 226 generates command sequences, such as program, read, and erase command sequences, to be transmitted to memory die 108. Command executer 228 oversees execution of those commands.

Non-volatile memory interface 230 provides the command sequences to memory die 108 and receives status information from memory die 108. Non-volatile memory interface 230 may be configured to access non-volatile memory (e.g., memory structure 126) on the memory die 108. Non-volatile memory interface 230 may provide an electrical connection to lines 118. Non-volatile memory interface 230 may control timing of signals over lines 118 to memory die 108. In one embodiment, memory interface 230 may be a double data rate (DDR) interface. In some embodiments, the memory interface 230 is a flash memory interface. However, the memory cells in memory die 108 are not limited to flash. Hence, memory interface 230 is not limited to a flash memory interface. In the event that memory cells in memory die 108 are flash, the back end module 210 may include a flash control layer, which controls the overall operation of back end module 210.

ECC engine 224 encodes the data bytes received from the host system 140, and decodes and error corrects the data bytes read from the memory die 108. In one embodiment, the ECC engine 224 comprises a low-density parity check (LDPC) decoder. Note that for both reads and writes, back end module 210 may perform additional processing of the data such as Error correction, scrambling, etc.

The components of memory controller 122 depicted in FIG. 2A may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, all or a portion of each module (including, but not limited to, host queue manager 246, HMB manager 250, DMA logic 253, host interface 222, non-volatile memory interface 230) may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, all or a portion of each module may include or comprise software stored in a processor readable device (e.g., memory) to program a one or more processors for memory controller 122 to perform the functions described herein. The architecture depicted in FIG. 2A is one example implementation that may (or may not) use the components of memory controller 122 depicted in FIG. 1B (e.g., RAM 122b, ROM 122a, processor 122c).

Note that as a matter of convenience of explanation, storage 251 is depicted as within the memory controller 122. For example, storage 251 (containing HMB pointers 172, management tables 256, and log pages 174) is depicted within the control path 242. Note that storage 251 can be located within the memory controller 122 or external to the memory controller 122. Also, storage 251 could be implemented in volatile memory (e.g., RAM 122b of FIG. 1B) or non-volatile memory (e.g., memory structure 126). For example, the management tables 256 could be stored in the memory structure 126, with a portion of the management tables 256 cached in RAM 122b.

Figure 2B:
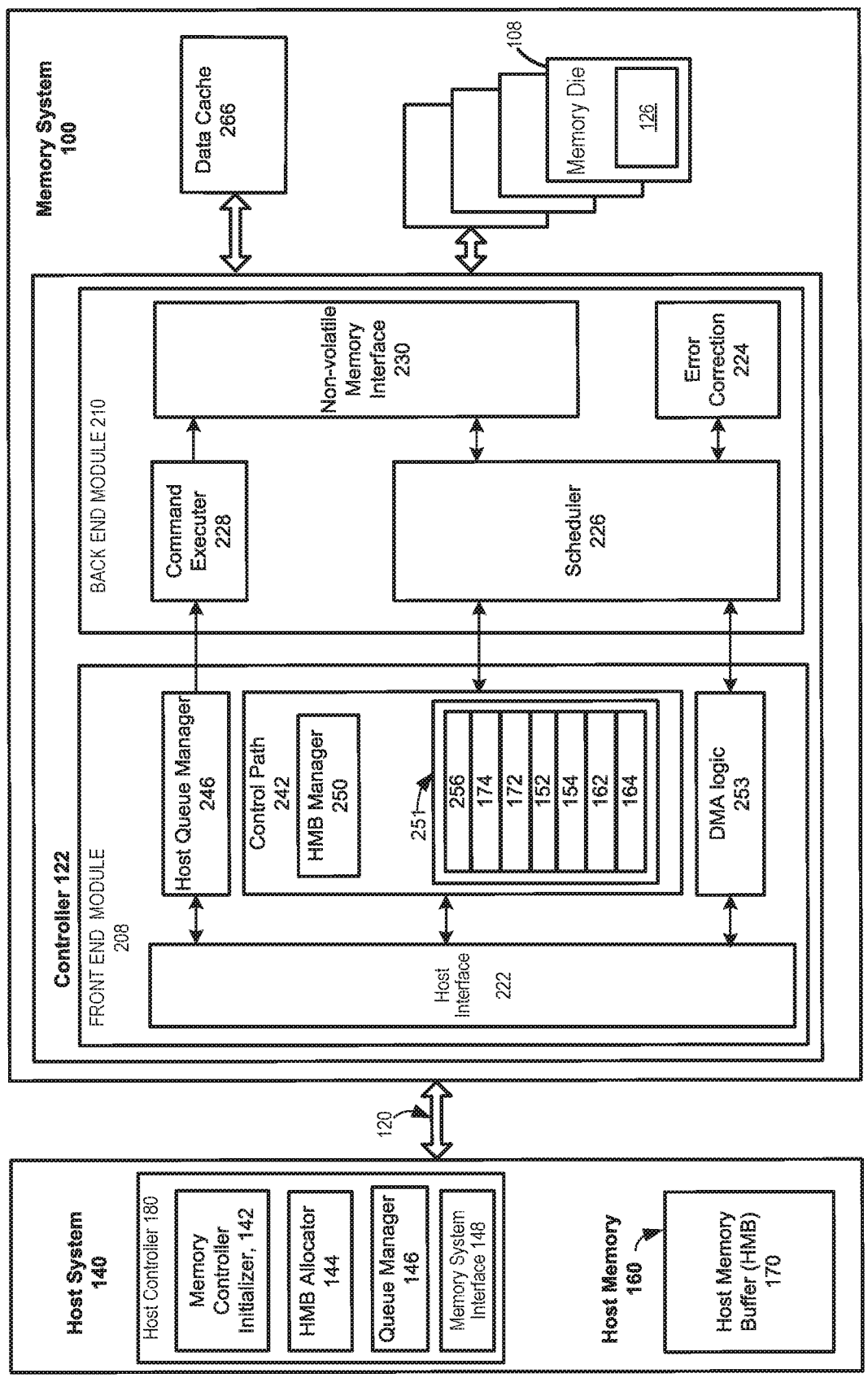
FIG. 2B is a block diagram of one embodiment of a non-volatile memory device and host, depicting more details of memory controller and host system.

FIG. 2B is a diagram of another embodiment of a non-volatile memory device 100 and host system 140. In this embodiment, admin submission queues 152, admin completion queues 154, SQs 162, CQs 164, and HMB pointers 172 are stored in the non-volatile memory device 100. The admin submission queues 152, admin completion queues 154, SQs 162, CQs 164, and HMB pointers 172 may be stored in volatile memory (e.g., RAM 122b) or non-volatile memory (e.g., memory structure 126). For example, the admin submission queues 152, admin completion queues 154, SQs 162, CQs 164, and HMB pointers 172 can be stored in flash memory cells in a memory array. The portion of storage that stores the admin submission queues 152, admin completion queues 154, SQs 162, CQs 164, and HMB pointers 172 may be referred to as a controller memory buffer (CMB). The submission queues (SQs) 162 in the non-volatile memory device 100 allow the host system 140 to directly write commands to the memory controller's internal memory space, in one embodiment. This alleviates the need for the memory controller 122 to access commands from the host memory 160. The HMB pointers 172 in the non-volatile memory device 100 allow the host system 140 to directly write the HMB pointers 172 to the memory controller's internal memory space, in one embodiment. A CMB based admin submission queues 152, admin completion queues 154, SQs 162, CQs 164, and HMB pointers 172 may be used in a similar manner when the admin submission queues 152, admin completion queues 154, SQs 162, CQs 164, and HMB pointers 172 are stored on the host system 140. A difference being that the memory controller's memory space is used instead of the host memory 160.

Other variations to the embodiments depicted in FIGS. 2A and 2B are possible. For example, any subset of the admin submission queues 152, admin completion queues 154, SQs 162, CQs 164, and HMB pointers 172 may be stored in the non-volatile memory device 100.

Figure 3:
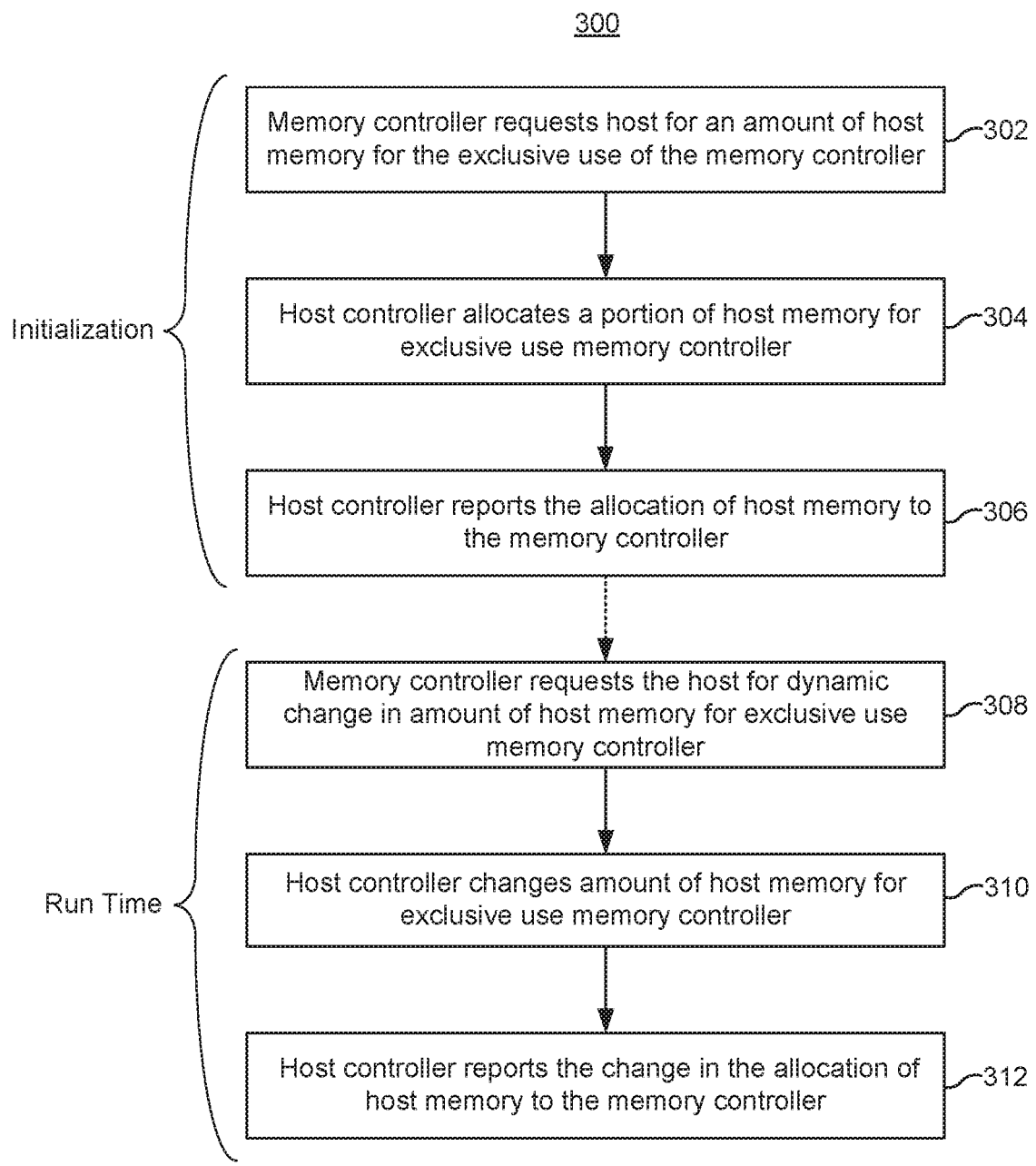
FIG. 3 is a flowchart of one embodiment of a process of operating non-volatile storage.

FIG. 3 is a flowchart of one embodiment of a process 300 of operating non-volatile storage. In one embodiment, the process 300 is performed in a system such as FIG. 1B, 2A or 2B. Some of the steps may be performed by host system 140 (e.g., by host controller 180), with others performed by memory system (e.g., by memory controller 122). In general, process 300 is divided between an initialization phase and a runtime phase. The initialization phase refers to initializing the memory controller 122. In one embodiment, the initialization phase is performed in accordance with an NVMe protocol. However, the initialization phase is not limited to NVMe. The initialization phase may be performed after a power on reset of the memory system 100. The initialization phase may be used to establish values in registers such as PCIe registers. The initialization phase may be used to allocate a number of command submission queues 162 and common completion queues 164. In one embodiment, the initialization phase is used to enable asynchronous event notifications. In one embodiment, the memory controller 122 makes an asynchronous event notification during runtime to request a change in host memory 160 that is allocated for exclusive use of the memory controller 122.

During runtime, the host system 140 (e.g., host controller 180) may issue memory access requests (e.g., read, write) to access memory structure 126 on a memory die 108. As will be discussed below, during runtime the memory controller 122 may request a change in the allocation of host memory that is allocated for exclusive use of the memory controller 122.

Steps 302-306 occur during memory controller initialization. Step 302 includes the memory controller 122 requesting the host controller 180 for an amount of host memory 160 for the exclusive use of the memory controller 122. Note that this refers to use by the memory controller 122 during runtime, in one embodiment. In one embodiment, the memory controller 122 makes a request in compliance with a version of the NVMe protocol. In one embodiment, the memory controller 122 request a Host Memory Buffer (HMB) in accordance with a version of the NVMe protocol. The memory controller 122 may specify a requested preferred size of the host memory 160. The memory controller 122 may specify a minimum size of the host memory 160 that is required by the memory controller 122.

Step 304 includes the host controller 180 allocating a region of the host memory 160 for the exclusive use of the memory controller 122. Note that this refers to use by the memory controller 122 during runtime, in one embodiment. Step 304 may be performed by the host controller 180 in response to the request from the memory controller 122 in step 302. In one embodiment, the host controller 180 generates a descriptor list which has pointers to the region of the host memory 160. Further details of embodiments in which descriptors are used are shown and described with respect to FIGS. 4 and 5.

Step 306 includes the host controller 180 reporting the allocation of the host memory 160 to the memory controller 122. In one embodiment, the host controller 180 sends a command to the memory controller 122 to report the allocation. In one embodiment, the host controller 180 sends an NVMe Set Features command. Note that after successful completion of step 306, the host controller 180 will not write to the allocated host memory 160 unless the host controller 180 first disables the allocation of host memory, in one embodiment. However, note that after successful completion of step 306 the host controller 180 might change the amount of the host memory 160 that is allocated to the memory controller 122, as described in steps 308-312. Also, note that after successful completion of step 306 the host controller 180 might change descriptors that point to the region of host memory 160 that is allocated to the memory controller 122, as described in steps 308-312.

Steps 308-312 occur during runtime. The dashed arrow between steps 306 and 308 indicates a transition from memory controller initialization to runtime. Step 308 includes the memory controller 122 requesting the host controller 180 for a dynamic change in the amount of host memory that is for the exclusive use of the memory controller 122. In one embodiment, the memory controller 122 requests a change in size of the HMB that was allocated during memory controller initialization. The memory controller 122 may request additional host memory 160 for exclusive use of the memory controller 122. The memory controller 122 may request the host controller 180 to release some of the host memory 160 that was for the exclusive use of the memory controller 122.

Note that the memory controller 122 might not have the ability to issue commands to the host controller 180 during runtime. For example, during runtime the host controller 180 might send memory access commands, and other commands to the memory controller 122. However, the memory access protocol might not allow the memory controller 122 to send a command to the host controller 180. For example, the host controller 180 might place memory access commands on a command submission queue 162 or an administrative queue. However, the memory access protocols might not have queues or other means for the memory controller 122 to issue a command to the host controller 180 during runtime.

In one embodiment, the memory controller 122 informs the host controller 180 that there is a log page 174 that specifies details of the request to change the amount of host memory 160 that is allocated for the exclusive use of the memory controller 122. In one embodiment, the memory controller 122 informs the host controller 180 of the location of the log page using an asynchronous event notification. In one embodiment, the memory controller 122 informs the host controller 180 in a response to a host command to check a log page for the request. For example, when the memory controller 122 provides a response to a read or write command, the memory controller 122 may include information in the response that tells the host controller 180 to check a log page for a request to change the amount of host memory 160 that is allocated for the exclusive use of the memory controller 122. Therefore, these embodiments allow the memory controller 122 to request a change in the amount of host memory 160 allocated for the exclusive use of the memory controller 122 even if the memory controller 122 is not able to send a command to the host controller 180.

Step 310 includes the host controller 180 changing the allocation of the host memory that is for the exclusive use of the memory controller 122. In one embodiment, step 310 includes the host controller 180 changing a descriptors list that has pointers to host memory 160 that is allocated for the exclusive use of the memory controller 122. Further details of embodiments in which descriptors are used are shown and described with respect to FIGS. 4 and 5.

Step 312 includes the host controller 180 reporting the change in the amount host memory that is for the exclusive use of the memory controller 122. In one embodiment, the host controller 180 sends a command to the memory controller 122 informing the memory controller 122 of the change. In one embodiment, this is a vendor specific command of a memory access protocol. In one embodiment, this is a vendor specific command in an NVMe protocol. In one embodiment, the command is a Set Features command in an NVMe protocol.

Note that the memory controller 122 might only use the additional host memory 160 for a limited time, after which the additional host memory may be released. For example, the memory controller 122 might use the additional host memory 160 for garbage collection, and then release the additional host memory. Thus, the memory controller 122 is still able to perform memory intensive tasks during runtime using the added host memory even if less host memory 160 is allocated to the memory controller 122 during initialization. Note that this can result in the memory controller 122 having less host memory 160 allocated to it for significant stretches of runtime.

Figure 4:
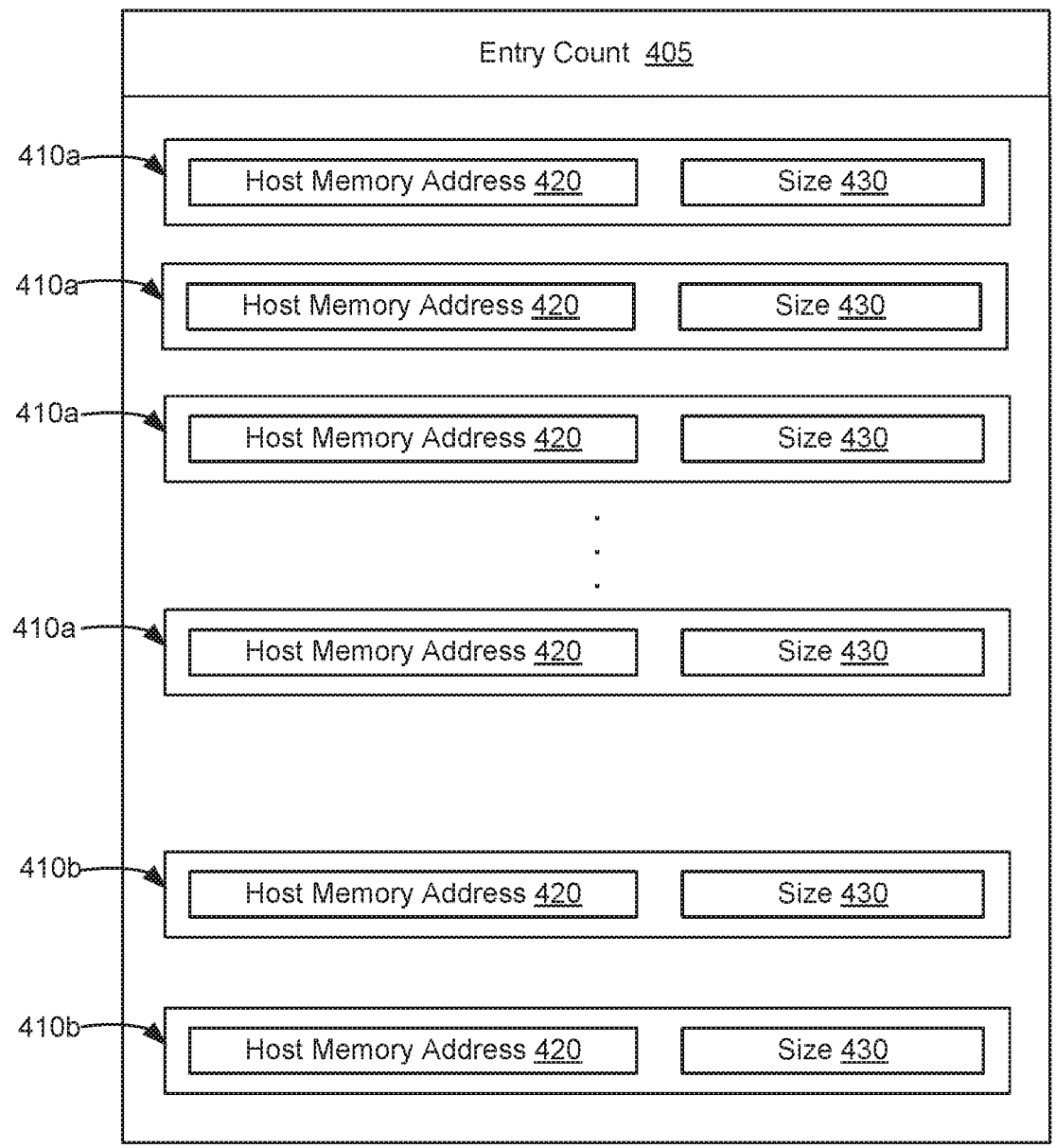
FIG. 4 is a diagram that shows one embodiment of HMB pointers.

FIG. 4 is a diagram that shows one embodiment of HMB pointers 172. The HMB pointers 172 may be referred to as a descriptor list, in this embodiment. The descriptor list 172 may be used to inform the memory controller 122 what regions of host memory 160 have been allocated for the exclusive use of the memory controller 122. The descriptor list may be used when dynamically (e.g., during runtime) changing the amount of host memory 160 that is allocated for the exclusive use of the memory controller 122. A copy of the descriptor list may be stored in host memory 160. In some embodiments, a copy of the descriptor list may be provided from the host controller 180 to the memory controller 122. In some embodiments, a copy of the descriptor list may be stored in RAM 122b in memory system 100.

The descriptor list has a number of entries 410a, 410b. Each entry 410a, 410b contains a host memory address 420 and a size 430. The host memory address 420 may contain a pointer to an address in host memory 160. The size 430 indicates the amount of memory at the address for that entry 410a, 410b. The descriptor list starts with an entry count 405, which may contain a count of how many total entries 410a, 410b are in the descriptor list.

The entries are divided between what may be referred to as static entries 410a and dynamic entries 410b. The static entries 410a are created by the host system 140 when the memory controller 122 is initialized, in one embodiment. For example, the static entries 410a may be created in step 304 of process 300. In one embodiment, the static entries 410a are compliant with a version of the NVMe protocol. The dynamic entries 410b are created by the host controller 180 during runtime, in one embodiment. For example, the dynamic entries 410b may be created in step 310 of process 300. In one embodiment, the dynamic entries 410b may be released by the memory controller 122 during runtime. Note that the reference number 410 may be used to refer to entry without explicit reference to the entry being a static entry 410a or a dynamic entry 410b. Also note that in general a descriptor list is not required to have both static entries 410a and dynamic entries 410b. In some cases, a descriptor list 172 might contain only static entries 410a. In some cases, a descriptor list 172 might contain only dynamic entries 410b.

Figure 5:
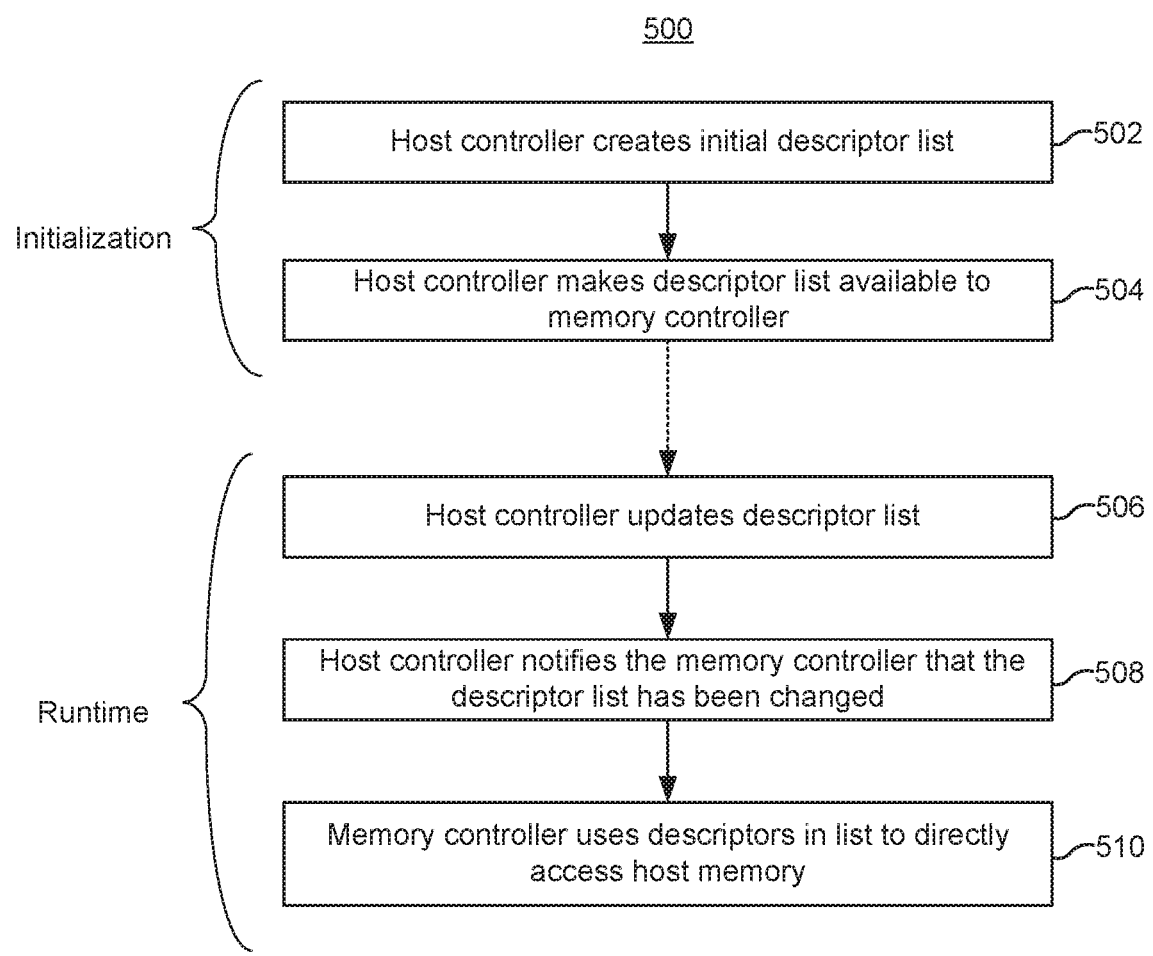
FIG. 5 is a flowchart of one embodiment of a process of dynamically changing an amount of host memory that is allocated for the exclusive use of a memory controller by use of a descriptor list.

FIG. 5 is a flowchart of one embodiment of a process 500 of dynamically changing an amount of host memory 160 that is allocated for the exclusive use of a memory controller 122 by use of a descriptor list. Process 500 provide details that may be included in one embodiment of steps 304, 306, 310, and 312 of process 300. Similar to process 300, process 500 is divided between memory controller 122 initialization and runtime. In some embodiments, the process 500 is performed in a system such as FIG. 1B, 2A or 2B. Some of the steps may be performed by host controller 180, with others performed by memory controller 122, as described below.

Step 502 includes the host controller 180 creating an initial descriptor list. For example, the host controller 180 may create static entries 410a in the descriptor list 172 in FIG. 4.

Step 504 includes the host controller 180 making the descriptor list 172 available to the memory controller 122. In one embodiment, the host controller 180 sends a command that contains the physical address of the start of the descriptor list 172. The physical address is in host memory 160, in one embodiment. In one embodiment, the command has a field that specifies the size of the host memory 160 that is being allocated for the exclusive use of the memory controller 122.

Steps 506-510 occur during runtime of the memory controller 122. The dashed arrow between steps 504 and 506 indicates a transition from memory controller initialization to runtime. Step 506 includes the host controller 180 updating the descriptor list 172. In one embodiment, the host controller 180 changes one or more dynamic entries 410b. The host controller 180 might add one or more dynamic entries 410b and/or remove one or more dynamic entries 410b.

Step 508 includes the host controller 180 notifying the memory controller 122 that the descriptor lust 172 has been changed. In one embodiment, the host controller 180 sends a vendor specific command of a memory access protocol to the memory controller 122. In one embodiment, the host controller 180 sends a vendor specific command of a NVMe protocol to the memory controller 122. In one embodiment, the host controller 180 sends an NVMe Set Features command to the memory controller 122.

Step 510 includes the memory controller 122 using the entries 410 in the descriptor list 172 to directly access host memory 160. Note that the memory controller 122 uses one or more dynamic entries 410b to directly access host memory 160, in one embodiment. The memory controller 122 may also use one or more of the static entries 410a to directly access host memory 160. The host memory accesses may include reads and/or writes.

Figure 6:
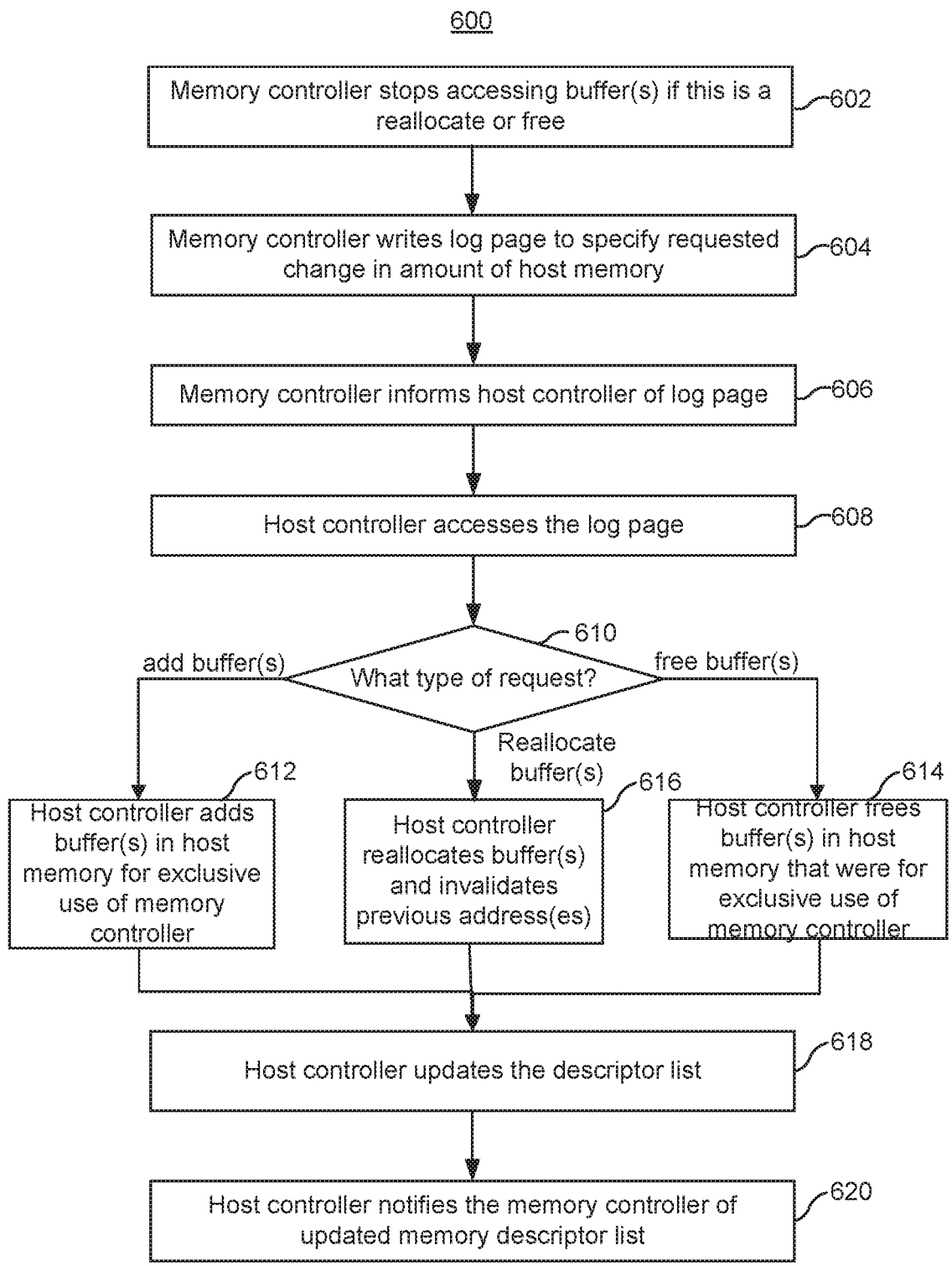
FIG. 6 is a flowchart of one embodiment of a process of a memory controller using a log page to notify a host system of a request to a change in an amount of host memory that is allocated for the exclusive use of the memory controller.

As noted herein, some memory access protocols do not have a way for a memory controller 122 to send a command to a host controller 180 during runtime. In some embodiments, the memory controller 122 uses a log page 174 to inform the host controller 180 of a request for a change in the amount of host memory 160 allocated for the exclusive use of the memory controller 122. FIG. 6 is a flowchart of one embodiment of a process 600 of a memory controller 122 using a log page 174 to notify a host controller 180 of a request to a change in an amount of host memory 160 that is allocated for the exclusive use of the memory controller 122. Process 600 may be initiated by the memory controller 122. In some embodiments, the process 600 is performed in a system such as FIG. 1B, 2A or 2B. Some of the steps may be performed by host controller 180, with others performed by memory controller 122, as described below.

Step 602 includes the memory controller 122 no longer accessing one or more buffer(s) in host memory 160 if this is request to free or reallocate host buffers. For example, the memory controller 122 stops accessing a region of the HMB 170.

Figure 7:
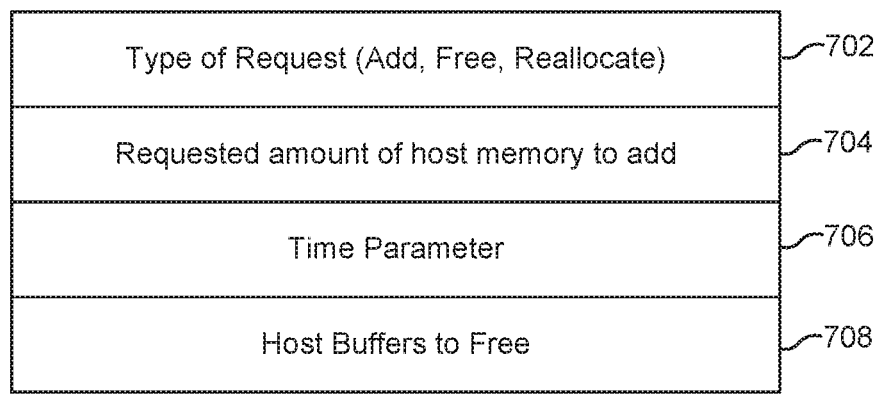
FIG. 7 depicts one embodiment of a log page that may be used to request a change in the amount of host memory allocated for the exclusive use of the memory controller.

Step 604 includes the memory controller 122 writing a log page 174 to specify a requested change in an amount of host memory 160 allocated for the exclusive use of the memory controller 122. FIG. 7 depicts one embodiment of a log page 174 that may be used to request a change in the amount of host memory allocated for the exclusive use of the memory controller 122. The log page 174 has a request field 702, which allows the memory controller 122 to indicate whether this is a request to add, free, or reallocate host memory. In one embodiment, a request to add is a request to add one or more host buffers. In one embodiment, a request to free is a request to free one or more specified host buffers. In one embodiment, a request to reallocate is a request to change the size of a specified block of host memory 160 with the host controller 180 possibly moving the data in the specified block to a new location in host memory 160. In one embodiment, the block is specified by one or more host buffers. Thus, a reallocate may result in one or more buffers being freed and one or more other buffers being added, in one embodiment.

The requested amount field 704 allows the memory controller 122 to specify an additional amount of host memory 160 desired by the memory controller 122. The requested amount field 704 may be used in connection with an add request or a reallocate request.

The time parameter 706 may be used to specify how long the memory controller 122 desires to have the added host memory, or the reallocated host memory.

The host buffers to free field 708 may be used to specify host buffers that are to be freed. In one embodiment, the memory controller 122 specifies one or more dynamic entries 410b from a descriptor list 172 in order to specify the host buffers to free. In one embodiment, the memory controller 122 specifies one or more host memory address, with a length parameter for each address. The host buffers to free field 708 may be used when the request is to free Step 606 includes the memory controller 122 informing the host controller 180 of the log page 174. In one embodiment, step 604 includes the memory controller 122 providing an asynchronous event notification to the host controller 180. Further details of one embodiment that uses an asynchronous event notification are shown and described with respect to FIG. 8A. In one embodiment, step 606 includes the memory controller 122 sending a response to a host command. Further details of one embodiment that uses a response to a host command to trigger the request are shown and described with respect to FIG. 8B. Note that in one embodiment, step 604 includes the memory controller 122 providing an address of the log page. In one embodiment, the host controller 180 is already aware of the address of the log page, in which case the memory controller 122 may simply indicate to the host controller 180 that it is to check the log page for the request.

Step 608 includes the host controller 180 accessing the log page 174. Step 608 may also include the host controller 180 parsing the log page 174 to determine the nature and details of the request.

Step 610 a decision of what action to perform based on what type of request is being made. In one embodiment, the request may be to add one or more host buffers (e.g., add host memory 160 for the exclusive use of the memory controller 122), free one or more host buffers (e.g., release host memory 160 that had been for the exclusive use of the memory controller 122), or to reallocate one or more host buffers. Reallocating host buffers may be used to free one or more host buffers, while adding one or more other host buffers.

If the request is to add one or more host buffers, then control passes to step 612. Step 610 includes the host controller 180 adding one or more host buffers in host memory 160 for the exclusive use of the memory controller 122. This step may include determining which buffers to allocate to the memory controller 122.

If the request is to free one or more host buffers, then control passes to step 614. Step 614 includes the host controller 180 freeing one or more host buffers in host memory 160 that were for the exclusive use of the memory controller 122.

If the request is to reallocate one or more host buffers, then control passes to step 616. Step 616 may include the host system 140 reallocating a block of one or more host buffers and invalidating an address of the one or more host buffers. Step 616 may include the host controller 180 freeing one or more host buffers in host memory 160 that were for the exclusive use of the memory controller 122, while adding one or more other host buffers in host memory 160 that are now to be for the exclusive use of the memory controller 122. In one embodiment, the reallocation process includes the host controller 180 moving data from the previous buffer(s) to the added buffer(s). Step 616 may result in a net increase or a net decrease in the number of host buffers that are allocated for the exclusive use of the memory controller 122, in one embodiment.

After one of steps 612, 614, or 616 is performed control passes to step 618. Step 618 includes the host controller 180 updating the descriptor list 172. If step 612 was performed, then the host controller 180 may create one or more dynamic entries 410b in the descriptor list 172. Note the that added host buffers might or might not be contiguous. Each dynamic entry 410b might point to one or more host buffers, depending on the buffer size and value in the size field 430.

If step 614 was performed, then the host controller 180 may remove and/or modify one or more dynamic entries 410b in the descriptor list 172 such that the descriptor list 172 no longer points to the freed host buffers.

If step 616 was performed, then the host controller 180 may add, remove and/or modify one or more dynamic entries 410b in the descriptor list 172. As a result, the descriptor list 172 will no longer points to the freed host buffers, but will point to any added host buffers.

Step 620 includes the host controller 180 notifying the memory controller 122 of the updated descriptor list 172. Step 620 may be performed as described in step 508 of process 500.

Figure 8A:
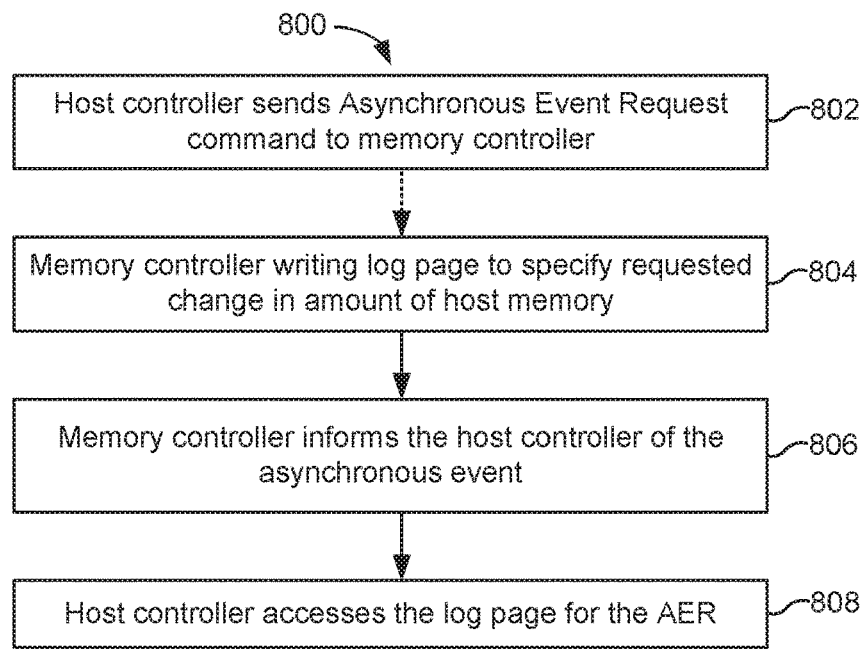
FIG. 8A is a process of one embodiment of a process of using an asynchronous event notification to trigger the request for the change in the amount of the host memory that is allocated for exclusive use of the memory controller.

As noted above, the memory access protocol in use might not allow the memory controller 122 to send commands to the host controller 180. FIG. 8A is a process 800 of one embodiment of a process 800 of using an asynchronous event notification to trigger the request for the change in the amount of the host memory 160 that is allocated for exclusive use of the memory controller 122. In some embodiments, the process 800 is performed in a system such as FIG. 1B, 2A or 2B. Some of the steps may be performed by host controller 180, with others performed by memory controller 122, as described below.

Step 802 includes the host controller 180 sending an Asynchronous Event Request (AER) command to the memory controller 122. The AER command could be sent by the host controller 180 during memory controller initialization or during runtime. The Asynchronous Event Request command may be submitted by the host controller 180 to enable the reporting of asynchronous events from the memory controller 122. In one embodiment, the AER command is an NVMe AER command. Note that other memory access protocols besides NVMe may have ways to allow a memory controller 122 to report an asynchronous event to a host system 140. Hence, the AER is not limited to being an NVMe AER command. In one embodiment, the AER command specifies a type of event. In one embodiment, the AER command is an NVMe AER command that specifies that the event is vendor specific.

There a dashed line between steps 802 and 804 to indicate that any amount of time may pass between steps 802 and 804. Note that the AER command does not have a timeout, in some embodiments. Step 804 includes the memory controller 122 writing a log page 174 to specify a requested change in the amount of host memory 160 that is allocated for the exclusive use of the memory controller 122. Step 804 is one embodiment of step 604 of process 600.

Step 806 includes the memory controller 122 informing the host controller 180 of the asynchronous event for the command from step 802. In one embodiment, the memory controller 122 posts a completion for the AER command to a command completion queue. In one embodiment, the memory controller 122 posts a completion queue entry for the AER command to an Admin Completion Queue 154. The Admin Completion Queue 154 is an NVMe Admin Completion Queue 154, in one embodiment. Step 806 is one embodiment of step 606 of process 600.

Step 808 includes the host controller 180 accessing the log page 174 for the AER. The host controller 180 may send a command to the memory controller 122 that specifies a log page that is to be returned by the memory controller 122. In one embodiment, the host controller 180 issues an NVMe Get Log Page command to the memory controller 122. The NVMe Get Log Page command may return a data buffer that contains the requested log page. Step 808 is one embodiment of step 608 of process 600. After step 808, the host system 140 may perform step 610, one of steps 612, 614, or 616 (depending on the type of request, step 618, and step 620.

Figure 8B:
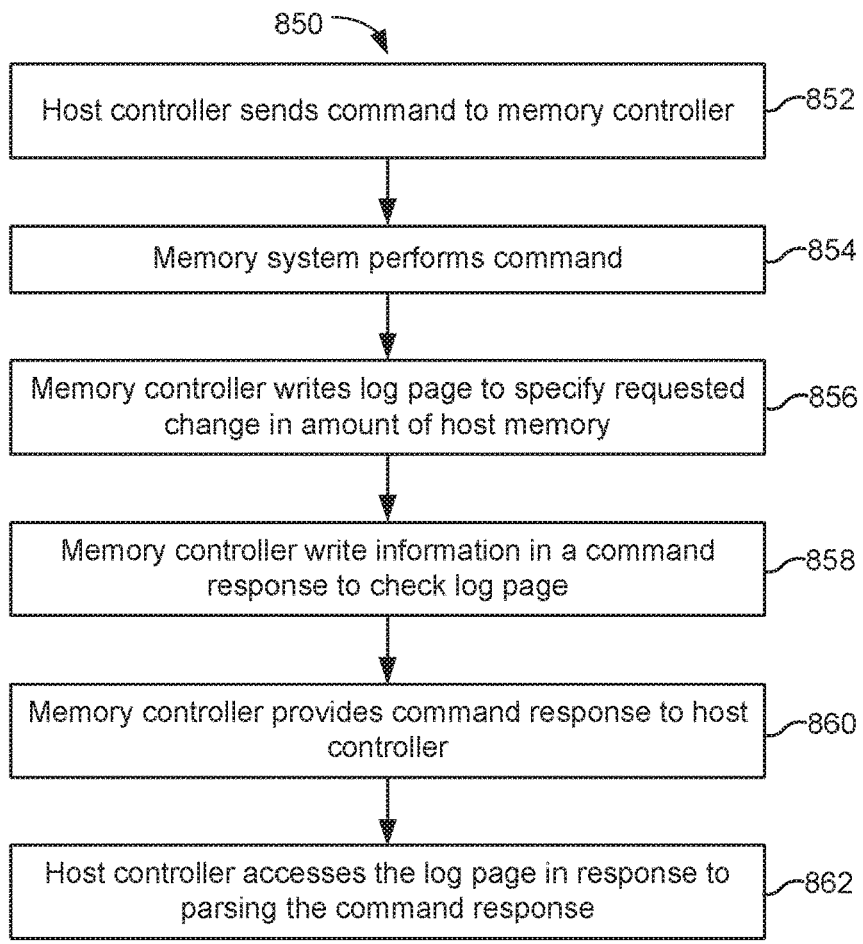
FIG. 8B is a process of one embodiment of a process of using a command response to trigger the request for the change in the amount of the host memory that is allocated for exclusive use of the memory controller.

As noted above, the memory access protocol in use might not allow the memory controller 122 to send commands to the host controller 180. FIG. 8B is a flowchart of one embodiment of a process 850 of using a command response to trigger the request for the change in the amount of the host memory 160 that is allocated for exclusive use of the memory controller 122. In some embodiments, the process 850 is performed in a system such as FIG. 1B, 2A or 2B. Some of the steps may be performed by host controller 180, with others performed by memory controller 122, as described below.

Step 852 includes the host controller 180 sending a command to the memory controller 122. This might be a memory access command such as a read or write command, but is not limited to being a memory access command. In one embodiment, the host controller 180 places the command on a command submission queue 162. In one embodiment, this is an NVMe command submission queue. In one embodiment, the host controller 180 places the command on an admin submission queue 152. In one embodiment, this is an NVMe admin submission queue.

Step 854 includes the memory system 100 performing the command. For example, the memory system might read data from memory structure 126, write data to memory structure 126, etc.

Step 856 includes the memory controller 122 writing a log page 174 to specify a requested change in an amount of host memory allocated for the exclusive use of the memory controller 122. Step 856 is one embodiment of step 604 of process 600.

Step 858 includes the memory controller 122 writing information in a data structure that is used for a response to the command (of step 852). In one embodiment, the memory controller 122 sets a flag in the data structure. For example, the memory access protocol being used for the command may have one or more reserved bits that can be used as the flag. The flag is used as an indicator to the host system 140 that there is a log page 174 to check.

In one embodiment, the memory controller 122 also provides a pointer in the command response, which pointer to the log page 174. However, the pointer is not required as the host controller 180 may have been previously informed as to the location of the log page 174. For example, process 800 might have been performed once to inform the host controller 180 of the location of the log page 174. Alternatively, the host controller 180 might be informed of the location of the log page 174 during memory controller initialization.

Step 860 includes the memory controller 122 providing the command response to the host controller 180. In one embodiment, the memory controller places the command response on a command completion queue 164. This is an NVMe command completion queue, in one embodiment. In one embodiment, the memory controller places the command response on an admin completion queue 154. This is an NVMe admin completion queue, in one embodiment. Step 860 is one embodiment of step 606 of process 600.

Step 862 includes the host controller 180 accessing the log page 174 in response to parsing the command response. Step 862 is one embodiment of step 608 of process 600. After step 862, the host controller 180 may perform step 610, one of steps 612, 614, or 616 (depending on the type of request, step 618, and step 620.

Figure 9:
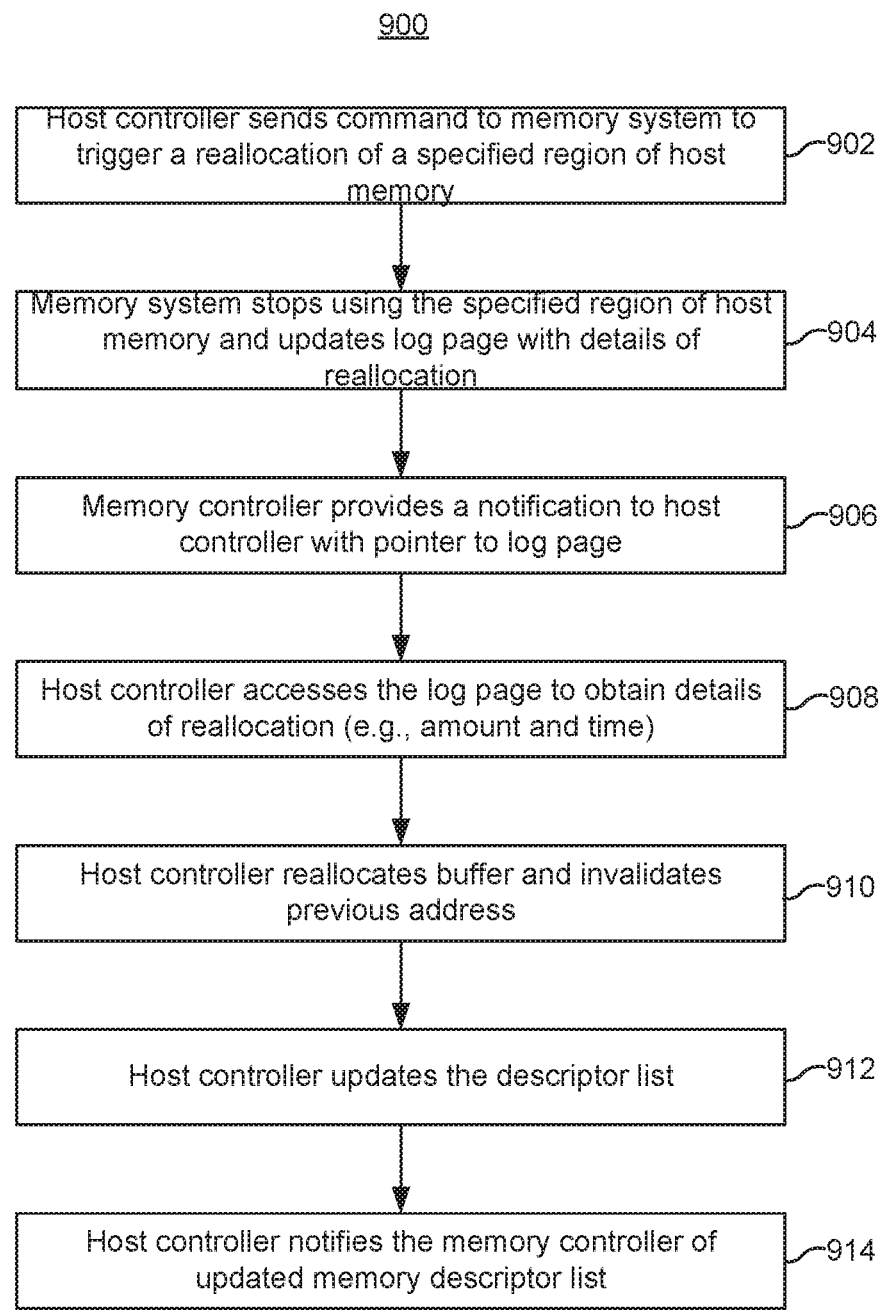
FIG. 9 is a flowchart of one embodiment of a process of host system initiating a re-allocation of a portion of the HMB.

In some cases, the host system 140 (e.g., host controller 180) might desire to have a portion of the HMB re-allocated. The re-allocation may result in a different portion of host memory 160 being used for HMB 170. The contents of the former region of the HMB 170 may be moved by the host controller 180 to the newly allocated portion of the HMB 170. FIG. 9 is a flowchart of one embodiment of a process 900 of host controller 180 initiating a re-allocation of a portion of the HMB 170. Process 900 may be performed in a system such as FIG. 1B, 2A or 2B, but is not limited thereto. Some of the steps of process 900 may be performed by host controller 180, with others performed by memory controller 122, as described below.

Step 902 includes the host controller 180 sending a command to the memory system 100 to trigger a re-allocation of a specified region of host memory 160. The specified region is a portion of the host memory (e.g., HMB 170) that at this point in time is allocated for the exclusive use of the memory controller 122. The command may identify one or more dynamic entries 410*b* in a descriptor list that are to be re-allocated. The command could also identify one or more static entries 410*a* in a descriptor list that are to be re-allocated.

In step 904, the memory controller 122 stops using the specified region in host memory 160. For example, the memory controller 122 accesses the dynamic entries 410*b* and/or static entries 410*a* identified by the host system 140 in step 902 to learn what region of host memory 160 it is to stop reading from and writing to. In one embodiment, the memory controller 122 is not required to save any data from this region, as the host system 140 is responsible for moving data from that region to the new allocation of host memory 160. In another embodiment, the memory controller 122 is responsible for saving any data in the region to be reallocated.

Step 904 may also include the memory controller 122 updating a log page 174 with details of the re-allocation. With reference to the example log page 174 of FIG. 7, memory controller 122 may set field 702 to indicate that this is a reallocate. Note that the host controller 180 may have informed the memory controller 122 of the location and amount of host memory 160 to be re-allocated. The memory controller 122 may set a value in the requested amount field 704 that is equal to, more than, or less than the amount of host memory to be re-allocated. The memory controller 122 may set a time parameter in field 706 to indicate how long the memory controller 122 would like the new allocation. The foregoing is just one example of how the memory controller 122 might specify details of the re-allocation.

Step 906 includes the memory controller 122 providing a notification to the host controller 180 that the memory controller 122 is stopped using the specified host memory that is to be reallocated. The notification may also contain a pointer to the log page 174 (of step 904). In one embodiment, the notification is an asynchronous notification as was described with respect to process 800 in FIG. 8A.

Step 908 includes the host controller 180 accessing the log page 174 to obtain details of the re-allocation.

Step 910 includes the host controller 180 re-allocating host data buffers (in host memory 160). For example, the host controller 180 may move data from a previously allocated host data buffer to a newly allocated host data buffer. Step 910 may also include the host invalidating previous address.

Step 912 includes the host controller 180 updating a descriptor list. For example, with reference to FIG. 4, the host controller 180 may remove selected dynamic entries 410*b* and/or or selected static entries 410*a*. In one embodiment, the host controller 180 only removes selected dynamic entries 410*b*. The host may also add new dynamic entries 410*b*.

Step 914 includes the host controller 180 notifying the memory controller 122 of the updated descriptor list 172. The host controller 180 may notify using techniques described in step 620 of process 600 in FIG. 6.

Figure 10:
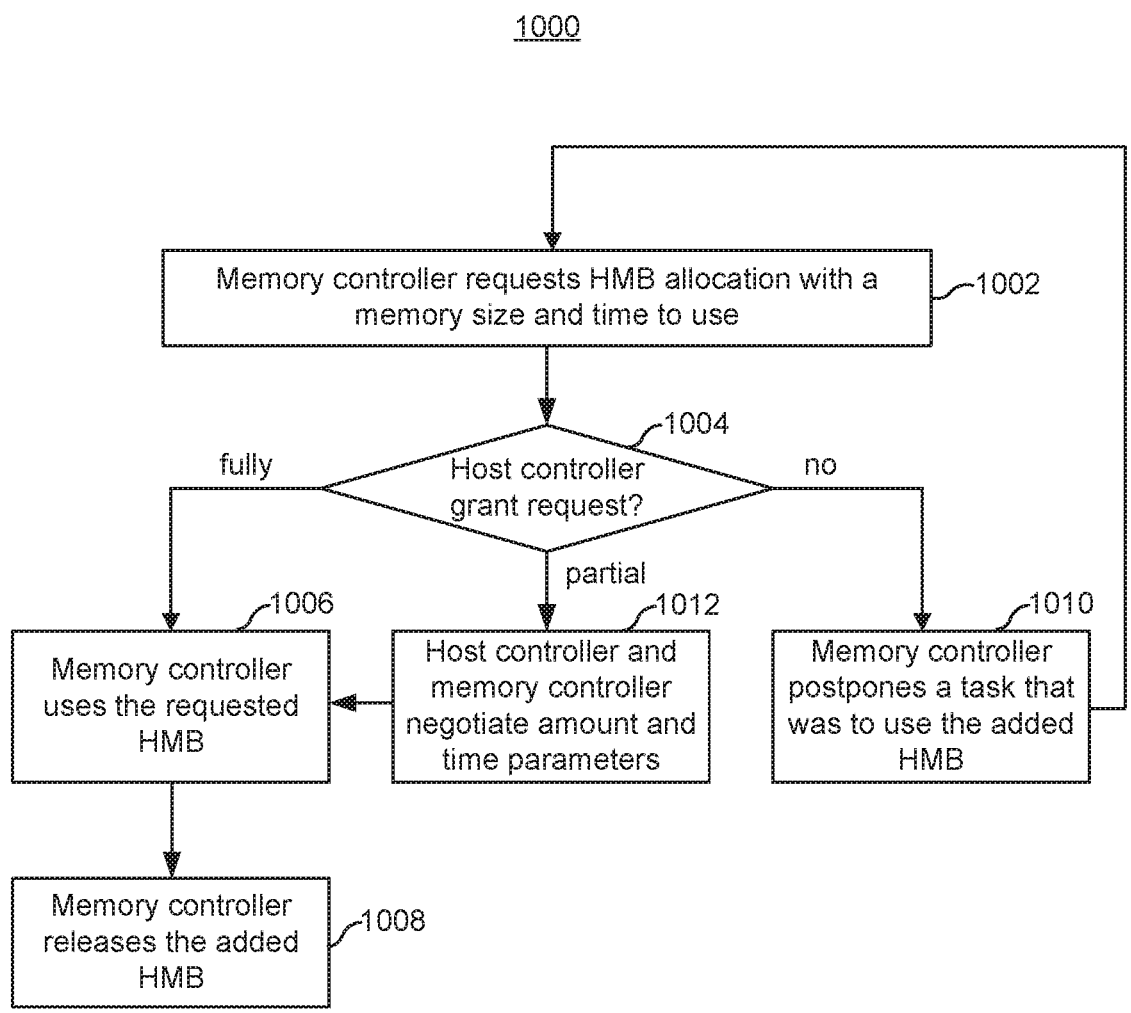
FIG. 10 is a flowchart of one embodiment of a process of a memory controller acting based on whether or not its request for additional host memory is granted by the host system.

FIG. 10 is a flowchart of one embodiment of a process 1000 of a memory controller 122 acting based on whether or not its request for additional host memory 160 is granted by the host controller 180. Process 1000 may be performed at runtime.

Step 1002 includes the memory controller 122 requesting an additional amount of host memory. The memory controller 122 also specifies a time parameter that indicates a time for which the memory controller desires to have the additional host memory for its exclusive use.

Step 1004 is a decision based on whether the host controller 180 grants the request. There are three branches based the degree to which the host controller 180 grants the request. The host might full grant the request, which means that the host controller 180 provides the entire requested amount of host memory 160, for at least the requested time. The host controller 180 might deny the request, which means that the host controller 180 will not grant the additional host memory for the requested time. The host controller 180 might be willing to partially grant the request, which means that the host controller 180 could mean that the host is willing to negotiate a lessor amount of host memory and/or a shorter time commitment.

If the host fully grants the request, control passes to step 1006. In step 1006, the memory controller 122 uses the host memory 160 to perform some task. For example, the memory controller 122 uses the additional host memory 160 to perform garbage collection. In step 1008, the memory controller 122 releases the added host memory 160. Note that the memory controller 122 may be configure to release the added host memory 160 prior to the expiration of the time to use the added host memory. As one example, the memory controller 122 may initiate process 600 to free the added host memory.

If the host controller 180 denies the request, then control passes to step 1012. In step 1010, the memory controller 122 postpones a task that was to use the added host memory 160. After some delay, the memory controller 122 again makes a request for added host memory in step 1002. Note that the host controller 180 might indicate to the memory controller 122 in the denial of the request how long that the memory system should wait.

If the host controller 180 indicates that it is willing to partially grant the request, then control passes to step 1012. In step 1012, the host controller 180 and memory controller 122 negotiate the amount of host memory 160 and/or time commitment (e.g., the time for exclusive memory controller use). After the host controller 180 and memory controller 122 reach agreement, control passes to step 1006. In step 1006, the memory controller 122 uses the negotiated amount of host memory for the negotiate time. In step 1008, the memory controller releases the added host memory.

A first embodiment disclosed herein includes an apparatus comprising a memory controller comprising: a host interface configured to provide communication with a host system that has host memory, a non-volatile memory interface configured to access non-volatile memory. The memory controller is configured to: control access of the host system to the non-volatile memory; make a runtime request to the host system for a specified amount of the host memory for exclusive use of the memory controller; and directly access the host memory over the host interface in response to the host granting the runtime request.

In a second embodiment in further of the first embodiment, the memory controller is further configured to: make a request during initialization of the memory controller for an initial allocation of the host memory for the exclusive use of the memory controller. The runtime request is an increase to the initial allocation. The memory controller is further configured to release the specified amount of the host memory during runtime while keeping the initial allocation.

In a third embodiment in further of either of the first or second embodiments, the memory controller is further configured to: update a log page in the memory controller to indicate the specified amount of the host memory; and notify the host of the log page.

In a fourth embodiment in further of the third embodiment, the memory controller is further configured to provide an asynchronous event notification to notify the host system of the log page.

In a fifth embodiment in further of the third or fourth embodiments, the memory controller is further configured to set information in a response to a command from the host system that instructs the host to check the log page for the specified amount of the host memory; and provide the response to the command to the host system.

In a sixth embodiment in further of any of the third to fifth embodiments, the memory controller is further configured set information in a response to a command from the host system, the information providing the runtime request for the specified amount of the host memory; and provide the response to the command to the host system.

In a seventh embodiment in further of any of the first to sixth embodiments, the runtime request is for an increase in a size of a Non-volatile Memory Express (NVMe) Host Memory Buffer (HMB).

In an eighth embodiment in further of any of the first to seventh embodiments, the memory controller is further configured to: include a time parameter in the runtime request, the time parameter indicating an amount of time for which the host system is to provide the memory controller with the exclusive use of the specified amount of the host memory; and release the specified amount of the host memory prior to expiration of the amount of time.

One embodiment includes an apparatus comprising: host memory; and a host controller having a memory system interface configured communicate with a memory system having a non-volatile memory controller. The host controller is configured to: during initialization of the non-volatile memory controller, provide the non-volatile memory controller with an amount of the host memory for exclusive use of the non-volatile memory controller. The host controller is further configured to access non-volatile memory in the memory system via the memory system interface; receive a request from the non-volatile memory controller after the non-volatile memory controller is initialized for a dynamic change in the amount of the host memory that is allocated for exclusive use of the non-volatile memory controller; and dynamically change the amount of the host memory that is allocated for exclusive use of the non-volatile memory controller in response to the request.

One embodiment includes a method of allocating a Non-volatile Memory Express (NVMe) Host Memory Buffer (HMB) in a host system to a Non-volatile Memory Express (NVMe) memory controller. The method comprises receiving a request from the NVMe memory controller for an amount of host memory in the host system as an HMB during an initialization of the NVMe memory controller; in response to the request during initialization, providing the NVMe memory controller with an HMB descriptor list having entries that point to regions of the host memory; during runtime after the initialization, receiving a request from the NVMe memory controller for additional host memory for the HMB; modifying the HMB descriptor list to include one or more entries to the additional host memory for the HMB; and providing the NVMe memory controller with an indication that the HMB descriptor list has been updated.

One embodiment includes a memory system comprising: host memory; means for initializing a non-volatile memory controller that has direct memory access of the host memory; and means for providing the non-volatile memory controller with a descriptor list when initializing the non-volatile memory controller. The descriptor list has entries that point to regions of the host memory that are for exclusive use of the non-volatile memory controller. The memory system further comprises means for dynamically updating the descriptor list in response to a runtime request from the non-volatile memory controller for additional host memory. The updated descriptor list has entries that point to regions of the host memory that are for the exclusive use of the non-volatile memory controller. The memory system further comprises means for providing the non-volatile memory controller with an indication that the descriptor list has been updated in response to the runtime request.

In one embodiment, the means for initializing a non-volatile memory controller comprises one or more of host controller 180, memory controller initializer 142, processors 150, memory system interface 148, interface 120, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the means for initializing a non-volatile memory controller could include other hardware and/or software.

In one embodiment, the means for providing the non-volatile memory controller with a descriptor list when initializing the non-volatile memory controller comprises one or more of host controller 180, memory controller initializer 142, HMB allocator 144, processors 150, memory system interface 148, interface 120, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the means for providing the non-volatile memory controller with a descriptor list when initializing the non-volatile memory controller could include other hardware and/or software.

In one embodiment, the means for dynamically updating the descriptor list in response to a runtime request from the non-volatile memory controller for additional host memory comprises one or more of host controller 180, HMB allocator 144, processors 150, memory system interface 148, interface 120, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the means for dynamically updating the descriptor list in response to a runtime request from the non-volatile memory controller for additional host memory could include other hardware and/or software.

In one embodiment, the means for providing the non-volatile memory controller with an indication that the descriptor list has been updated in response to the runtime request comprises one or more of host controller 180, HMB allocator 144, processors 150, memory system interface 148, interface 120, an electrical circuit, an application specific integrated circuit (ASIC), a Field Programmable Gate Array (FPGA), a digital logic circuit, an analog circuit, a combination of discrete circuits, gates, and/or a portion of a program code (e.g., software or firmware) executable by a (micro)processor or processing circuitry (or one or more processors). However, the means for providing the non-volatile memory controller with an indication that the descriptor list has been updated in response to the runtime request could include other hardware and/or software.

One embodiment includes a memory system, comprising: host memory; a communication interface; a host controller in communication with the host memory and the communication interface; non-volatile memory; and a memory controller in communication with the non-volatile memory and the communication interface. The memory controller is configured to: control access over the communication interface of the host controller to the non-volatile memory; during an initialization of the memory controller, request the host controller for an amount of the host memory for exclusive use of the memory controller; receive descriptors that point to regions of the host memory that are allocated during the initialization for the exclusive use of the memory controller; during runtime of the memory controller, request the host controller for a change in the amount of the host memory that is allocated for the exclusive use of the memory controller; receive a change to the descriptors that point to regions of the host memory that are allocated for the exclusive use of the memory controller; and based on the descriptors, directly access a portion of the host memory that is allocated for the exclusive use of the memory controller.

Corresponding methods, systems and computer- or processor-readable storage devices which have executable code for performing the methods provided herein may also be provided.

For the purpose of this document, the numeric terms first (i.e., $1^{st}$) and second (i.e., $2^{nd}$) may be used to generally specify an order of when commands (e.g., write commands) are received by a memory controller from a host, as well as to generally specify an order in which data (e.g., $1^{st}$ and $2^{nd}$ data) is to be stored in non-volatile memory. However, it is noted that the term first (i.e., $1^{st}$) should not be interpreted as implying that nothing else precedes it.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the terms "based on" and "in dependence on" may be read as "based at least in part on."

For purposes of this document, a "set" may include one or more elements.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. An apparatus, comprising:
   a memory controller comprising:
      a host interface configured to provide communication with a host system that has host memory; and
      a non-volatile memory interface configured to access non-volatile memory;
   wherein the memory controller is configured to:
      control access of the host system to the non-volatile memory;
      make a runtime request to the host system for a specified amount of the host memory for exclusive use of the memory controller, comprising including a time parameter in the runtime request, wherein the time parameter indicates an amount of time for which the host system is to provide the memory controller with the exclusive use of the specified amount of the host memory;
      directly access the host memory over the host interface in response to the host system granting the runtime request; and
      release the specified amount of the host memory prior to or upon expiration of the amount of time.

2. The apparatus of claim 1, wherein the memory controller is further configured to:

make a request during initialization of the memory controller for an initial allocation of the host memory for the exclusive use of the memory controller, the runtime request being an increase to the initial allocation; and release the specified amount of the host memory during runtime while keeping the initial allocation.

3. The apparatus of claim 1, wherein the memory controller is further configured to:

update a log page in the memory controller to indicate the specified amount of the host memory; and notify the host system of the log page.

4. The apparatus of claim 3, wherein the memory controller is further configured to:

provide an asynchronous event notification to notify the host system of the log page.

5. The apparatus of claim 3, wherein the memory controller is further configured to:

set information in a response to a command from the host system that instructs the host system to check the log page for the specified amount of the host memory; and provide the response to the command to the host system.

6. The apparatus of claim 1, wherein the memory controller is further configured to:

set information in a response to a command from the host system, the information providing the runtime request for the specified amount of the host memory; and provide the response to the command to the host system.

7. The apparatus of claim 1, wherein the runtime request is for an increase in a size of a Non-volatile Memory Express (NVMe) Host Memory Buffer (HMB).

8. An apparatus comprising:

host memory; and a host controller having a memory system interface configured to communicate with a memory system having a non-volatile memory controller, the host controller configured to:

during initialization of the non-volatile memory controller, provide the non-volatile memory controller with an amount of the host memory for exclusive use of the non-volatile memory controller;

provide a descriptor list to the non-volatile memory controller when the non-volatile memory controller is initialized, the descriptor list having pointers to regions of the host memory that are allocated for exclusive use of the non-volatile memory controller;

access non-volatile memory in the memory system via the memory system interface;

receive a request from the non-volatile memory controller after the non-volatile memory controller is initialized for a dynamic change in the amount of the host memory that is allocated for exclusive use of the non-volatile memory controller;

dynamically change the amount of the host memory that is allocated for exclusive use of the non-volatile memory controller in response to the request;

update the descriptor list to point to regions of the host memory that are allocated for exclusive use of the non-volatile memory controller in response to the request for the dynamic change in the amount of host memory that is allocated for exclusive use of the non-volatile memory controller; and make the updated descriptor list available to the non-volatile memory controller.

9. The apparatus of claim 8, wherein the descriptor list is an NVMe host memory buffer descriptor list.

10. The apparatus of claim 8, wherein the host controller is further configured to:

dynamically add a buffer in the host memory for exclusive use of the non-volatile memory controller in response to the request from the non-volatile memory controller for the dynamic change in the amount of the host memory that is allocated for exclusive use of the non-volatile memory controller.

11. The apparatus of claim 10, wherein the host controller is further configured to:

dynamically remove the buffer in the host memory from exclusive use of the non-volatile memory controller in response to a request from the non-volatile memory controller to release the buffer.

12. The apparatus of claim 8, wherein the host controller is further configured to:

access a log page from the non-volatile memory controller in order to obtain the request from the non-volatile memory controller for the dynamic change in the amount of the host memory.

13. The apparatus of claim 8, wherein the host controller is further configured to:

send a command to the non-volatile memory controller to reallocate a specified region of the host memory that was allocated for the exclusive use of the non-volatile memory controller;

receive a notification from the non-volatile memory controller that the non-volatile memory controller is no longer using the specified region of the host memory; and notify the non-volatile memory controller of a new region in the host memory that replaces the specified region of the host memory for exclusive use of the non-volatile memory controller after the host controller receives the notification from the non-volatile memory controller.

14. A method of allocating a Non-volatile Memory Express (NVMe) Host Memory Buffer (HMB) in a host system to a Non-volatile Memory Express (NVMe) memory controller, the method comprising:

receiving a request from the NVMe memory controller for an amount of host memory in the host system as an HMB during an initialization of the NVMe memory controller;

in response to the request during initialization, providing the NVMe memory controller with an HMB descriptor list having entries that point to regions of the host memory;

during runtime after the initialization, receiving a request from the NVMe memory controller for additional host memory for the HMB;

modifying the HMB descriptor list to include one or more entries to the additional host memory for the HMB; and providing the NVMe memory controller with an indication that the HMB descriptor list has been updated.

15. The method of claim 14, further comprising:

receiving a request from the NVMe memory controller to release the additional host memory that was for the HMB; and notifying the NVMe memory controller that the additional host memory has been released.

16. The method of claim 14, further comprising:

updating a log page in the NVMe memory controller to indicate the requested additional host memory; and notifying the host system of the log page.

17. The method of claim 14, further comprising:

including a time limit in the request for the additional host memory; and releasing the additional host memory prior to or upon expiration of the time limit.

18. A memory system comprising:
host memory;
means for initializing a non-volatile memory controller that has direct memory access of the host memory;
means for providing the non-volatile memory controller with a descriptor list when initializing the non-volatile memory controller, the descriptor list having entries that point to regions of the host memory that are for exclusive use of the non-volatile memory controller;
means for dynamically updating the descriptor list in response to a runtime request from the non-volatile memory controller for additional host memory, the updated descriptor list having entries that point to regions of the host memory that are for the exclusive use of the non-volatile memory controller; and
means for providing the non-volatile memory controller with an indication that the descriptor list has been updated in response to the runtime request.

19. A memory system, comprising:
host memory;
a communication interface;
a host controller in communication with the host memory and the communication interface;
non-volatile memory; and
a memory controller in communication with the non-volatile memory and the communication interface, the memory controller configured to:
control access over the communication interface of the host controller to the non-volatile memory;
during an initialization of the memory controller, request the host controller for an amount of the host memory for exclusive use of the memory controller;
receive descriptors that point to regions of the host memory that are allocated during the initialization for the exclusive use of the memory controller;
during runtime of the memory controller, request the host controller for a change in the amount of the host memory that is allocated for the exclusive use of the memory controller;
receive a change to the descriptors that point to regions of the host memory that are allocated for the exclusive use of the memory controller; and
based on the descriptors, directly access a portion of the host memory that is allocated for the exclusive use of the memory controller.

20. The memory system of claim 19, wherein the memory controller is further configured to:
update a log page in the memory controller to specify a requested change in the amount of the host memory for the exclusive use of the memory controller; and
notify the host controller of the log page.

21. The memory system of claim 19, wherein the communication interface includes a Peripheral Component Interconnect Express (PCIe) bus.

22. The memory system of claim 19, wherein the descriptors are Non-volatile Memory Express (NVMe) Host Memory Buffer (HMB) descriptors.

23. An apparatus, comprising:
a memory controller comprising:
a host interface configured to provide communication with a host system that has host memory; and
a non-volatile memory interface configured to access non-volatile memory;
wherein the memory controller is configured to:
control access of the host system to the non-volatile memory;
make a runtime request to the host system for a specified amount of the host memory for exclusive use of the memory controller, including use a response to a memory access command from the host system to trigger the runtime request; and
directly access the host memory over the host interface in response to the host system granting the runtime request.

24. The apparatus of claim 23, wherein the memory controller is configured to include the runtime request for the specified amount of the host memory in the response to the memory access command.

25. The apparatus of claim 23, wherein the memory controller is configured to:
update a log page in the memory controller to indicate the specified amount of the host memory; and
provide an indication in the response to the memory access command that instructs the host system to check the log page for the specified amount of the host memory.

* * * * *